(12) United States Patent
Ide et al.

(10) Patent No.: US 11,079,045 B2
(45) Date of Patent: Aug. 3, 2021

(54) ELECTRIC RESISTANCE WELDED CLAD STEEL PIPE OR TUBE AND METHOD OF PRODUCING SAME

(71) Applicant: JFE STEEL CORPORATION, Tokyo (JP)

(72) Inventors: Shinsuke Ide, Tokyo (JP); Akihide Matsumoto, Tokyo (JP); Atsushi Matsumoto, Tokyo (JP); Takatoshi Okabe, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 300 days.

(21) Appl. No.: 16/331,235

(22) PCT Filed: Aug. 31, 2017

(86) PCT No.: PCT/JP2017/031489
§ 371 (c)(1),
(2) Date: Mar. 7, 2019

(87) PCT Pub. No.: WO2018/047722
PCT Pub. Date: Mar. 15, 2018

(65) Prior Publication Data
US 2019/0186655 A1 Jun. 20, 2019

(30) Foreign Application Priority Data

Sep. 12, 2016 (JP) .............................. JP2016-177916
Sep. 12, 2016 (JP) .............................. JP2016-177950

(51) Int. Cl.
*F16L 9/17* (2006.01)
*B23K 13/06* (2006.01)
(Continued)

(52) U.S. Cl.
CPC ................ *F16L 9/17* (2013.01); *B21C 37/08* (2013.01); *B23K 11/0006* (2013.01);
(Continued)

(58) Field of Classification Search
None
See application file for complete search history.

(56) References Cited

U.S. PATENT DOCUMENTS

2018/0243809 A1    8/2018 Okabe et al.

FOREIGN PATENT DOCUMENTS

JP    S60221173 A    11/1985
JP    S61172684 A     8/1986
(Continued)

OTHER PUBLICATIONS

Aug. 29, 2019, the Extended European Search Report issued by the European Patent Office in the corresponding European Patent Application No. 17848662.7.
(Continued)

*Primary Examiner* — Adam Krupicka
(74) *Attorney, Agent, or Firm* — Kenja IP Law PC

(57) ABSTRACT

Provided is an electric resistance welded clad steel pipe or tube in which a region where solidification microstructure is formed, i.e. a region in a weld particularly having significant influence on properties, is reduced without impairing its function as a clad pipe or tube. An electric resistance welded clad steel pipe or tube comprises: a first layer made of carbon steel or low-alloy steel as base metal; and a second layer placed on one surface of the first layer, and made of stainless steel or a nickel-containing alloy as cladding metal, wherein the base metal is not exposed at a cladding metal-side surface of the electric resistance welded clad steel pipe or tube in a weld, and no solidification microstructure is contained in each of circular sections of 0.1 mm in radius (Continued)

respectively centered at specific three positions in a plane perpendicular to a pipe or tube longitudinal direction.

20 Claims, 10 Drawing Sheets

(51) Int. Cl.
| | |
|---|---|
| B21C 37/08 | (2006.01) |
| B23K 13/00 | (2006.01) |
| C22C 38/00 | (2006.01) |
| C21D 9/08 | (2006.01) |
| C21D 9/50 | (2006.01) |
| C22F 1/00 | (2006.01) |
| C22C 38/60 | (2006.01) |
| B23K 11/00 | (2006.01) |
| B23K 11/02 | (2006.01) |
| B23K 11/093 | (2006.01) |
| B32B 1/08 | (2006.01) |
| B32B 15/01 | (2006.01) |
| C22C 19/05 | (2006.01) |
| C22C 38/02 | (2006.01) |
| C22C 38/04 | (2006.01) |
| C22C 38/06 | (2006.01) |
| C22C 38/42 | (2006.01) |
| C22C 38/44 | (2006.01) |
| C22C 38/48 | (2006.01) |
| C22C 38/50 | (2006.01) |
| C22F 1/10 | (2006.01) |
| B23K 103/04 | (2006.01) |
| B23K 101/10 | (2006.01) |

(52) U.S. Cl.
CPC .......... *B23K 11/02* (2013.01); *B23K 11/0935* (2013.01); *B23K 13/00* (2013.01); *B23K 13/06* (2013.01); *B32B 1/08* (2013.01); *B32B 15/011* (2013.01); *B32B 15/015* (2013.01); *C21D 9/08* (2013.01); *C21D 9/085* (2013.01); *C21D 9/50* (2013.01); *C22C 19/056* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/42* (2013.01); *C22C 38/44* (2013.01); *C22C 38/48* (2013.01); *C22C 38/50* (2013.01); *C22C 38/60* (2013.01); *C22F 1/00* (2013.01); *C22F 1/10* (2013.01); *B23K 2101/10* (2018.08); *B23K 2103/05* (2018.08); *B32B 2597/00* (2013.01)

(56) References Cited

FOREIGN PATENT DOCUMENTS

| | | |
|---|---|---|
| JP | S62156087 A | 7/1987 |
| JP | S6380993 A | 4/1988 |
| JP | H05154545 A | 6/1993 |
| WO | 2016143271 A1 | 9/2016 |

OTHER PUBLICATIONS

Oct. 17, 2017, International Search Report issued in the International Patent Application No. PCT/JP2017/031489.

Groove shape of butted parts (parts to be welded)

Projection clad ratio $R_1 = (t_{c1}^* + d_1)/t \times 100$

Cross section of weld after welding

Weld clad ratio $r_1 = t_{w1}/t \times 100$ (Z1 portion in detail)

Nozzle height H = 5~300 mm
Preferred R/W > 1.0

Cross section of Z2 portion

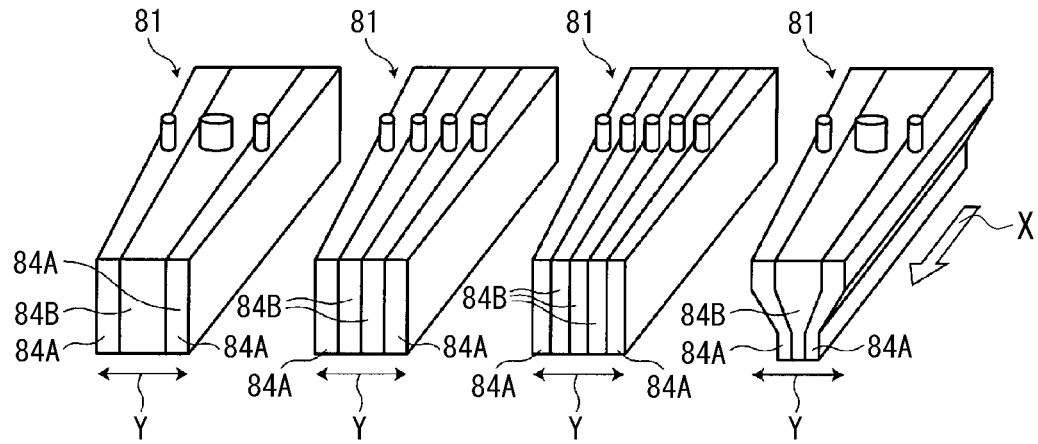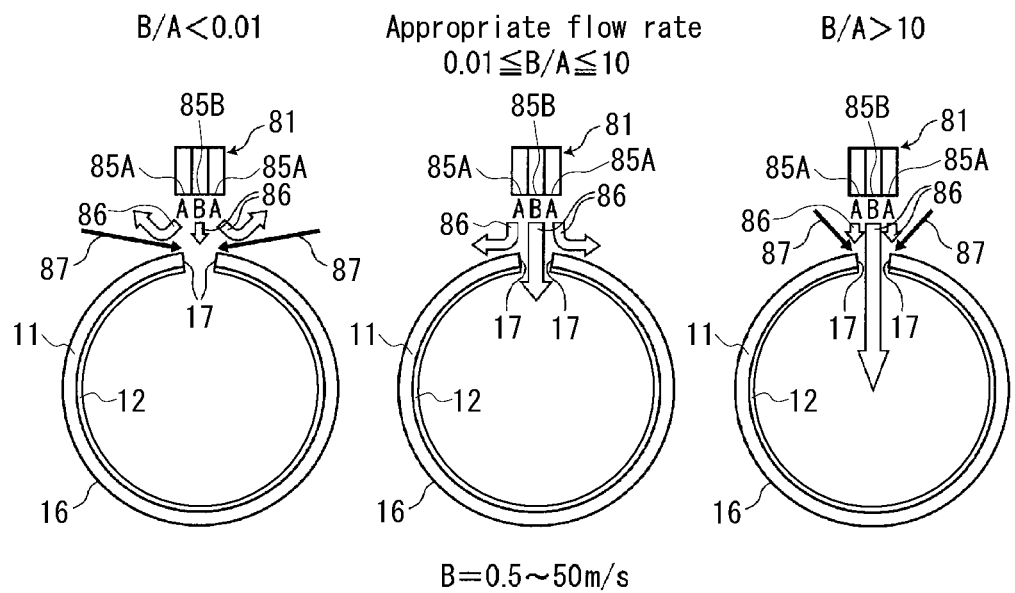

Groove shape of butted parts (parts to be welded)

Projection clad ratio $R2=(t_{c2}^{*}+d2)/t \times 100$

Projection clad ratio $R1=(t_{c1}^{*}+d1)/t \times 100$

Cross section of weld after welding (Z1 portion in detail)

Nozzle height H = 5~300 mm
Preferred R/W > 1.0

Cross section of Z2 portion

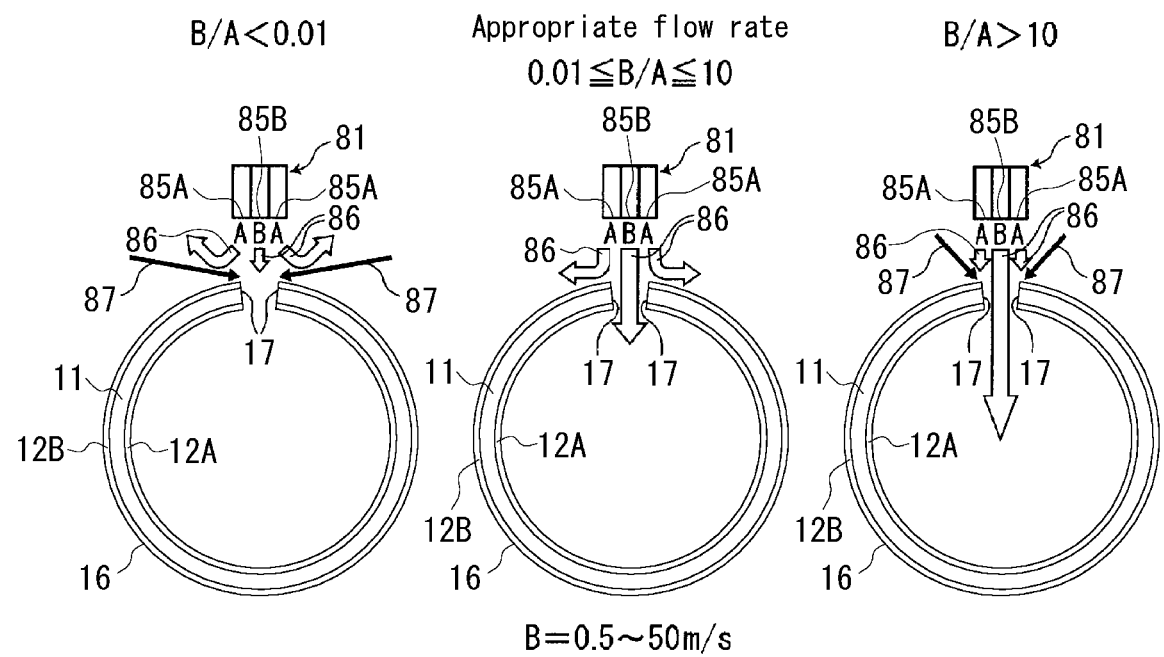

ELECTRIC RESISTANCE WELDED CLAD STEEL PIPE OR TUBE AND METHOD OF PRODUCING SAME

TECHNICAL FIELD

The present disclosure relates to an electric resistance welded clad steel pipe or tube and a method of producing the same.

BACKGROUND

An electric resistance welded steel pipe or tube is typically produced by forming a steel sheet (also referred to as "steel strip") into a pipe or tube shape and, using squeeze rolls, butt pressing and welding both transverse ends of the steel strip heated and molten by high-frequency current and facing each other. It is known that, in the case where the steel sheet is welded in this way, various properties such as toughness, strength, and elongation in the weld degrade as compared with the steel sheet before the welding. Hence, to improve the performance of the electric resistance welded steel pipe or tube, the weld and in particular the region where solidification microstructure is formed needs to be reduced.

Another technique proposed to improve the properties of an electric resistance welded steel pipe or tube is an electric resistance welded clad steel pipe or tube. The electric resistance welded clad steel pipe or tube is an electric resistance welded steel pipe or tube produced using a clad steel sheet that is obtained by cladding a steel sheet as base metal with a metal sheet (cladding metal, also referred to as "cladding material") made of a material different from the base metal. Combining the different materials in this way makes it possible to obtain a steel pipe or tube having excellent properties by benefiting from the properties of both the base metal and the cladding metal. For example, in the case of using carbon steel as the base metal and a stainless steel sheet as the cladding metal, an electric resistance welded clad steel pipe or tube having both the corrosion resistance of the stainless steel sheet and the strength of the carbon steel can be obtained.

Techniques for such electric resistance welded clad steel pipes or tubes are disclosed in, for example, JP S60-221173 A (PTL 1), JP S62-156087 A (PTL 2), and JP H05-154545 A (PTL 3).

PTL 1 discloses a method of producing a clad pipe or tube, whereby at least the cladding metal-side bead of the weld bead formed by butt welding both facing edges of a clad steel sheet bent in a pipe or tube shape is removed by cutting to a depth reaching the base metal, and the cut portion is subjected to weld overlaying in which welding material having similar properties to the cladding metal is used.

PTL 2 discloses a method of producing a clad steel pipe or tube, whereby, after forming a clad steel strip into an open pipe or tube that is a cylindrical strip before welding and electric resistance welding the joint edge parts, dissimilar metal that has entered the welded seam is diluted. The dilution is performed by any of the following methods (1) and (2): (1) A region to a depth of the clad interface along the welded seam in which dissimilar metal has entered is melted and solidified to dilute the dissimilar metal. (2) The seam part in which dissimilar metal has entered is weld-overlaid using the same type of metal as the cladding metal, and then the overlaid weld is rolled to dilute the dissimilar metal.

PTL 3 discloses a method of producing a clad steel pipe or tube by electric resistance welding a clad steel sheet having cladding metal on the inner surface side. The production method comprises forming the clad steel sheet into a pipe-or-tube-shaped body so that the cladding metal forms the inner surface, subjecting at least a portion of butted parts of the cladding metal of the pipe-or-tube-shaped body to electric resistance welding, and then subjecting the non-welded butted parts to weld overlaying.

CITATION LIST

Patent Literatures

PTL 1: JP S60-221173 A
PTL 2: JP S62-156087 A
PTL 3: JP H05-154545 A

SUMMARY

Technical Problem

The techniques described in PTL 1 to PTL 3 all need to perform, after the electric resistance welding, post-treatment such as weld overlaying or melting and solidification on the weld, for the following reasons.

In the electric resistance welding, oxide-based weld defects called penetrators occur in the weld, that is, the portion at which both circumferential ends of the steel sheet formed into a pipe or tube shape are butted. The penetrators decrease the toughness and strength of the weld. To prevent the penetrators from remaining in the weld, a measure is typically employed to increase the amount of upset by squeeze rolls so that oxidized melts formed during the welding are discharged to outside the pipe or tube.

However, if the amount of upset is increased as described above in the case of producing an electric resistance welded clad steel pipe or tube using a clad steel sheet as raw material, the following problem arises. FIG. 15A is a diagram schematically illustrating a weld section when a clad steel sheet composed of a base metal 11 and a cladding metal 12 is electric resistance welded so that the cladding metal 12 forms the inner surface. If the amount of upset is large, the molten base metal 11 enters a welded seam part 14 of the cladding metal 12. In particular, if the amount of upset is excessively large, the base metal 11 is exposed at the cladding metal 12—side surface of the steel pipe or tube, as illustrated in FIG. 15A. This causes a decrease in performance in the site where the base metal 11 is exposed, and impairs the advantage as a clad steel pipe or tube.

For example, in the case of using a clad steel sheet obtained by cladding low-carbon steel as the base metal 11 with stainless steel as the cladding metal 12 for the purpose of corrosion resistance improvement, as a result of the base metal 11 being exposed to the cladding metal side as illustrated in FIG. 15A, i.e. as a result of the low-carbon steel inferior in corrosion resistance being exposed to the cladding metal side, the corrosion resistance near the welded seam part 14 at the steel pipe or tube inner surface decreases significantly.

To solve this problem, PTL 1 and PTL 2 propose subjecting the weld to weld overlaying with the same material as the cladding metal after the electric resistance welding. With this method, however, the weld with inferior properties increases as a result of weld overlaying, although the base metal exposed part can be eliminated. PTL 2 also proposes a method involving melting and solidification instead of weld overlaying. With this method, however, the portion that has undergone melting and solidification has solidification microstructure similar to the weld metal, and thus is inferior in properties.

With the method described in PTL 3, only the cladding metal side is subjected to welding and then the base metal side is subjected to weld overlaying, so that the base metal can be prevented from being exposed to the cladding metal side. However, since the base metal is joined by weld overlaying, the weld increases as compared with the case of joining the base metal by typical electric resistance welding.

Thus, the conventional methods described in PTL 1 to PTL 3 cannot simultaneously achieve the following two purposes: (1) reducing the width of the weld in order to suppress property degradation caused by the weld metal; and (2) preventing a decrease in performance as a clad steel pipe or tube caused by the base metal being exposed to the cladding metal side. The same problem occurs in the case of using, as raw material, a three-layer clad steel sheet having cladding metal on the front and back of base metal. As illustrated in FIG. 15B, if the amount of upset is large, molten base metal 11 enters a welded seam part 14 of cladding metal 12A or 12B, and the base metal 11 is exposed at the cladding metal 12—side surface of the steel pipe or tube (i.e. the inner surface and the outer surface of the steel pipe or tube).

It could therefore be helpful to provide an electric resistance welded clad steel pipe or tube in which a region where solidification microstructure is formed, i.e. a region in a weld particularly having significant influence on properties, is reduced without impairing its function as a clad pipe or tube, and a method of producing the same.

Solution to Problem

We conducted intensive study to solve the problem stated above, and discovered the following (1) to (4).

(1) By indenting both transverse ends of a clad steel strip from the cladding metal side to form a Y-groove of a specific shape before electric resistance welding, the molten base metal can be prevented from being exposed at the cladding metal-side surface after the electric resistance welding.

(2) By blowing shielding gas under appropriate conditions using a shielding-gas blowing nozzle having a specific structure during the welding, the oxygen concentration around the parts to be welded can be greatly reduced to thus suppress penetrator formation.

(3) As a result of (2), even when the amount of upset is reduced, penetrators will not remain in the weld, and the properties of the weld can be improved. Moreover, by reducing the amount of upset, the molten base metal can be prevented from being exposed at the cladding metal-side surface.

(4) By precisely controlling the combination of the conditions of the groove machining, the shielding gas, and the amount of upset mentioned above, the exposure of the base metal at the cladding metal-side surface can be completely prevented. Consequently, an electric resistance welded clad steel pipe or tube excellent in performance such as corrosion resistance can be obtained without performing post-treatment such as weld overlaying or melting and solidification as in the conventional techniques. Moreover, since the region where solidification microstructure is formed can be reduced significantly, the mechanical properties of the electric resistance welded clad steel pipe or tube, in particular the weld toughness, can be improved.

We thus provide the following.

1. An electric resistance welded clad steel pipe or tube, comprising:
a first layer made of carbon steel or low-alloy steel as base metal; and
a second layer placed on one surface of the first layer, and made of stainless steel or a nickel-containing alloy as cladding metal,
wherein the base metal is not exposed at a cladding metal-side surface of the electric resistance welded clad steel pipe or tube in a weld (welded portion), and
no solidification microstructure is contained in each of circular sections of 0.1 mm in radius respectively centered at the following positions (i) to (iii) in a plane perpendicular to a pipe or tube longitudinal direction:
(i) a position that is 1 mm in depth from an outer surface of the electric resistance welded clad steel pipe or tube in the weld and is 0.3 mm in a transverse direction of weld metal from a center of a width of the weld metal in a pipe or tube circumferential direction;
(ii) a position that is a center of the electric resistance welded clad steel pipe or tube in a thickness direction in the weld and is 0.3 mm in the transverse direction of the weld metal from the center of the width of the weld metal in the pipe or tube circumferential direction; and
(iii) a position that is 1 mm in depth from an inner surface of the electric resistance welded clad steel pipe or tube in the weld and is 0.3 mm in the transverse direction of the weld metal from the center of the width of the weld metal in the pipe or tube circumferential direction.

2. The electric resistance welded clad steel pipe or tube according to 1., composed of the first layer and the second layer.

3. The electric resistance welded clad steel pipe or tube according to 2., wherein one of the following (A) and (B) is satisfied:
(A) the first layer is located on an outer side of the electric resistance welded clad steel pipe or tube, and metallic microstructure at the positions (i) and (ii) is metallic microstructure in which a total area ratio of ferrite and bainite is 90% or more and an average grain size of ferrite and bainite is 15 μm or less; and
(B) the first layer is located on an inner side of the electric resistance welded clad steel pipe or tube, and metallic microstructure at the positions (ii) and (iii) is metallic microstructure in which a total area ratio of ferrite and bainite is 90% or more and an average grain size of ferrite and bainite is 15 μm or less.

4. The electric resistance welded clad steel pipe or tube according to 1., composed of the first layer, the second layer, and a third layer placed on an other surface of the first layer and made of stainless steel or a nickel-containing alloy as cladding metal.

5. The electric resistance welded clad steel pipe or tube according to 4., wherein metallic microstructure at the position (ii) is metallic microstructure in which a total area ratio of ferrite and bainite is 90% or more and an average grain size of ferrite and bainite is 15 μm or less.

6. The electric resistance welded clad steel pipe or tube according to any one of 1. to 5., wherein the cladding metal is stainless steel having a chemical composition containing (consisting of), in mass %,
C: 0.15% or less,
Si: 5.0% or less,
Mn: 2.0% or less,
P: 0.1% or less,
S: 0.1% or less, Ni: 1.0% or less,
Cr: 11.0% or more, and
N: 0.5% or less,
with the balance being Fe and inevitable impurities.

7. The electric resistance welded clad steel pipe or tube according to any one of 1. to 5., wherein the cladding metal is stainless steel or a nickel-containing alloy having a chemical composition containing, in mass %,
C: 0.15% or less,
Si: 5.0% or less,
Mn: 2.0% or less,
P: 0.1% or less,
S: 0.1% or less,
Ni: 6.0% or more,
Cr: 15.0% or more, and
N: 0.5% or less,
with the balance being Fe and inevitable impurities.

8. The electric resistance welded clad steel pipe or tube according to 6. or 7., wherein the chemical composition of the cladding metal further contains, in mass %, one or more selected from the group consisting of
Mo: 20.0% or less,
Cu: 5.0% or less,
Al: 2.0% or less,
Co: 3.0% or less,
W: 5.0% or less, and
Ta: 5.0% or less.

9. The electric resistance welded clad steel pipe or tube according to any one of 6. to 8., wherein the chemical composition of the cladding metal further contains, in mass %, one or more selected from the group consisting of
Ti: 2.0% or less,
Nb: 5.0% or less,
V: 2.0% or less, and
Zr: 2.0% or less.

10. The electric resistance welded clad steel pipe or tube according to any one of 6. to 9., wherein the chemical composition of the cladding metal further contains, in mass %, one or more selected from the group consisting of
B: 0.0050% or less,
Ca: 0.0050% or less,
Mg: 0.0030% or less, and
REM: 0.10% or less.

11. The electric resistance welded clad steel pipe or tube according to any one of 1. to 10., wherein the base metal is carbon steel or low-alloy steel having a chemical composition containing, in mass %,
C: 0.02% to 0.20%,
Si: 0.01% to 1.0%,
Mn: 0.1% to 2.0%,
P: 0.05% or less,
S: 0.01% or less, and
Al: 0.1% or less,
with the balance being Fe and inevitable impurities.

12. The electric resistance welded clad steel pipe or tube according to 11., wherein the chemical composition of the base metal further contains, in mass %, one or more selected from the group consisting of
Ti: 0.1% or less,
Nb: 0.2% or less,
Cu: 0.5% or less,
Ni: 0.5% or less,
Cr: 0.5% or less,
Mo: 0.5% or less,
V: 0.1% or less, and
Ca: 0.0005% to 0.0050%.

13. A method of producing an electric resistance welded clad steel pipe or tube, the method comprising:
preparing a clad steel strip including a first layer made of carbon steel or low-alloy steel as base metal and a second layer placed on one surface of the first layer and made of stainless steel or a nickel-containing alloy as cladding metal;
subjecting both transverse ends of the clad steel strip to groove machining, to form a groove (bevel);
forming the clad steel strip into a pipe or tube shape, to obtain an open pipe or tube that is a cylindrical strip before welding; and
electric resistance welding a pair of butted parts of the open pipe or tube facing each other, to obtain an electric resistance welded clad steel pipe or tube,
wherein in the groove machining, the transverse ends of the clad steel strip are indented from a second layer side,
the groove satisfies the following conditions:
a clad interface between the second layer and the first layer turns from the second layer side toward a thickness center of the clad steel strip;
a bevel angle $\theta 1$ on the second layer side is 10° or more and 50° or less;
a groove depth d1 is 10% or more and 45% or less of a thickness t of the clad steel strip; and
a projection clad ratio R1 defined by the following Expression (1) is 25% or more and 50% or less, $$R1=(t_{c1}^{*}+d1)/t\times 100(\%) \qquad (1)$$

where R1 is the projection clad ratio, $t_{c1}^{*}$ is a thickness of the second layer at a root surface in mm, d1 is the groove depth on the second layer side in mm, and t is the thickness of the clad steel strip in mm,
the electric resistance welding is performed by, while subjecting the pair of butted parts to gas shielding, butt pressing the pair of butted parts with an amount of upset of not greater than the thickness t of the clad steel strip, and
the gas shielding is performed by blowing a shielding gas using a shielding-gas blowing nozzle having three or more slit-shaped gas outlets arranged in parallel with and adjacent to each other in a butting direction of the open pipe or tube at a position of 5 mm to 300 mm above upper ends of the butted parts of the open pipe or tube, under conditions that B is 0.5 m/s to 50 m/s and $0.010 \leq B/A \leq 10$, where A is a gas release flow rate in m/s from a pair of first gas outlets located at both ends among the gas outlets, and B is a gas release flow rate in m/s from a second gas outlet other than the first gas outlets.

14. The method of producing an electric resistance welded clad steel pipe or tube according to 13., wherein the clad steel strip is composed of the first layer and the second layer, and
the groove is a Y-groove.

15. The method of producing an electric resistance welded clad steel pipe or tube according to 14., further comprising
after the electric resistance welding, heat treating and then cooling the electric resistance welded clad steel pipe or tube,
wherein the heat treating is performed under conditions that a heating temperature at a cladding metal-side surface of the electric resistance welded clad steel pipe or tube is 750° C. to 1250° C. and a holding time at 750° C. to 1250° C. is 10 sec or more, and a heating temperature at a base metal-side surface of the electric resistance welded clad steel pipe or tube is 750° C. to 1200° C. and a holding time at 750° C. to 1200° C. is 10 sec or more, and
the cooling is performed under conditions that an average cooling rate from 750° C. to 400° C. at the cladding metal-side surface of the electric resistance welded clad steel pipe or tube is 4° C./sec to 100° C./sec, and an average cooling rate from 750° C. to 400° C. at the base metal-side surface of the electric resistance welded clad steel pipe or tube is 8° C./sec to 70° C./sec.

16. The method of producing an electric resistance welded clad steel pipe or tube according to 13., wherein the clad steel strip is composed of the first layer, the second layer, and a third layer placed on an other surface of the first layer and made of stainless steel or a nickel-containing alloy as cladding metal, in the groove machining, further the transverse ends of the clad steel strip are indented from a third layer side, the groove is an X-groove, the groove further satisfies the following conditions:

a clad interface between the third layer and the first layer turns from the third layer side toward the thickness center of the clad steel strip;

a bevel angle θ2 on the third layer side is 10° or more and 50° or less;

a groove depth d2 is 10% or more and 45% or less of the thickness t of the clad steel strip; and a projection clad ratio R2 defined by the following Expression (2) is 25% or more and 50% or less, $$R2=(t_{c2}^{*}+d2)/t\times 100(\%) \qquad (2)$$

where R2 is the projection clad ratio, $t_{c2}^{*}$ is a thickness of the third layer at the root surface in mm, d2 is the groove depth on the third layer side in mm, and t is the thickness of the clad steel strip in mm.

17. The method of producing an electric resistance welded clad steel pipe or tube according to 16., further comprising after the electric resistance welding, heat treating and then cooling the electric resistance welded clad steel pipe or tube, wherein the heat treating is performed under conditions that a heating temperature at inner and outer surfaces of the electric resistance welded clad steel pipe or tube is 750° C. to 1250° C. and a holding time at 750° C. to 1250° C. is 10 sec or more, and a heating temperature at a wall thickness center position of the electric resistance welded clad steel pipe or tube is 750° C. to 1200° C. and a holding time at 750° C. to 1200° C. is 10 sec or more, and the cooling is performed under conditions that an average cooling rate from 750° C. to 400° C. at the inner and outer surfaces of the electric resistance welded clad steel pipe or tube is 4° C./sec to 100° C./sec, and an average cooling rate from 750° C. to 400° C. at the wall thickness center position of the electric resistance welded clad steel pipe or tube is 8° C./sec to 70° C./sec.

18. The method of producing an electric resistance welded clad steel pipe or tube according to any one of 13. to 17., wherein the cladding metal has the chemical composition according to any one of 6. to 10.

19. The method of producing an electric resistance welded clad steel pipe or tube according to any one of 13. to 18., wherein the base metal has the chemical composition according to 11. or 12.

Advantageous Effect

It is thus possible to obtain an electric resistance welded clad steel pipe or tube in which a region where solidification microstructure is formed, i.e. a region in a weld particularly having significant influence on properties, is reduced without impairing its function as a clad pipe or tube

BRIEF DESCRIPTION OF THE DRAWINGS

In the accompanying drawings:

FIG. 6A is a schematic diagram illustrating an example of a nozzle usable in Embodiments 1 and 2 of the present disclosure;

FIG. 6B is a schematic diagram illustrating an example of the nozzle usable in Embodiments 1 and 2 of the present disclosure;

FIG. 6C is a schematic diagram illustrating an example of the nozzle usable in Embodiments 1 and 2 of the present disclosure;

FIG. 6D is a schematic diagram illustrating an example of the nozzle usable in Embodiments 1 and 2 of the present disclosure;

FIG. 7A is a diagram for explaining an appropriate range of a gas release flow rate B and a gas flow rate ratio B/A of shielding gas in Embodiment 1 of the present disclosure;

FIG. 7B is a diagram for explaining the appropriate range of the gas release flow rate B and the gas flow rate ratio B/A of the shielding gas in Embodiment 1 of the present disclosure;

FIG. 7C is a diagram for explaining the appropriate range of the gas release flow rate B and the gas flow rate ratio B/A of the shielding gas in Embodiment 1 of the present disclosure;

FIG. 14A is a diagram for explaining an appropriate range of a gas release flow rate B and a gas flow rate ratio B/A of shielding gas in Embodiment 2 of the present disclosure;

FIG. 14B is a diagram for explaining the appropriate range of the gas release flow rate B and the gas flow rate ratio B/A of the shielding gas in Embodiment 2 of the present disclosure;

FIG. 14C is a diagram for explaining the appropriate range of the gas release flow rate B and the gas flow rate ratio B/A of the shielding gas in Embodiment 2 of the present disclosure;

DETAILED DESCRIPTION

Figure 1:
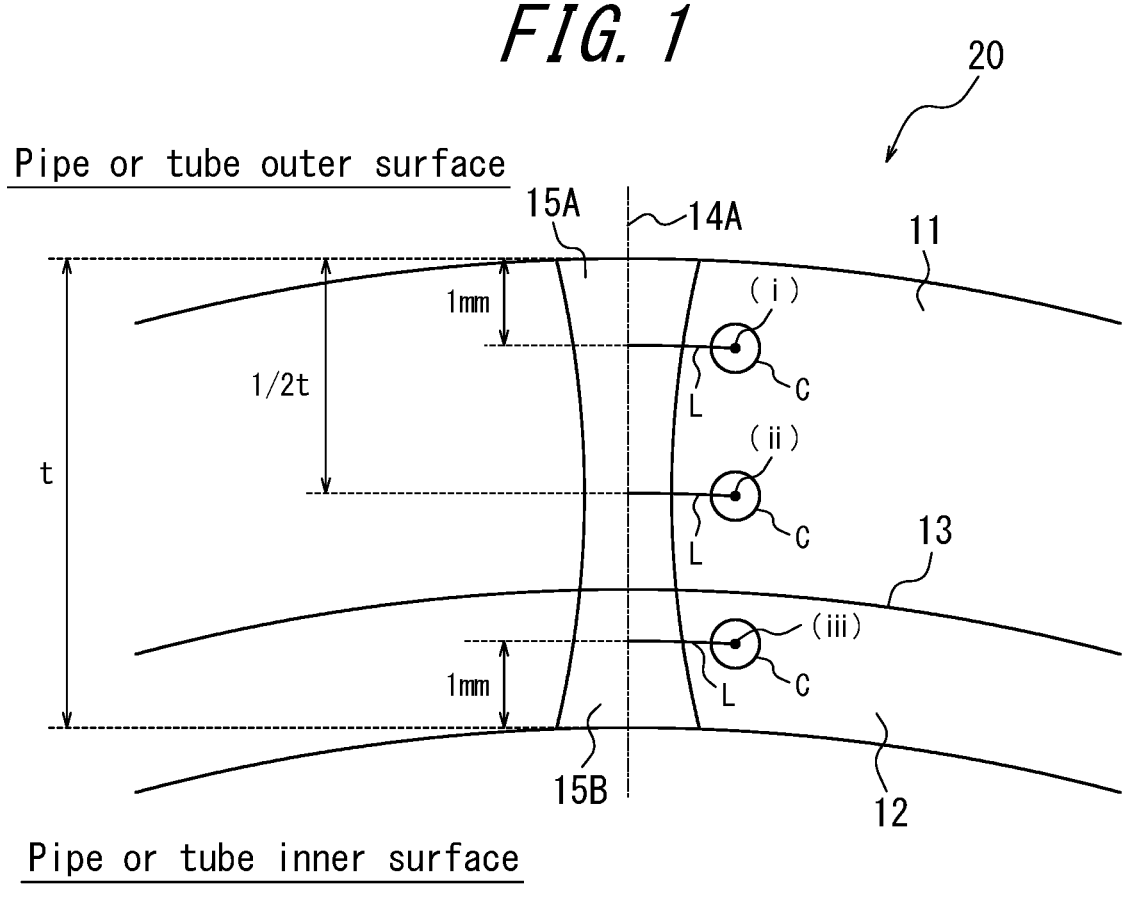
FIG. 1 is a sectional diagram of the vicinity of an electric resistance welded clad steel pipe or tube 20 according to Embodiment 1 of the present disclosure perpendicular to the pipe or tube longitudinal direction.

Detailed description will be given below.

An electric resistance welded clad steel pipe or tube according to the present disclosure includes at least a first layer and a second layer placed on one surface of the first layer. The first layer is made of carbon steel or low-alloy steel as base metal, and the second layer is made of stainless steel or a nickel-containing alloy as cladding metal. An electric resistance welded clad steel pipe or tube according to one of the disclosed embodiments may be an electric resistance welded two-layer clad steel pipe or tube composed of the first layer and the second layer. An electric resistance welded clad steel pipe or tube according to another one of the disclosed embodiments may further include a third layer placed on the other surface of the first layer. In other words, the electric resistance welded clad steel pipe or tube may be an electric resistance welded three-layer clad steel pipe or tube composed of the first layer, the second layer placed on one surface of the first layer, and the third layer placed on the other surface of the first layer. The third layer is made of stainless steel or a nickel-containing alloy as cladding metal.

A method for carrying out the presently disclosed techniques will be described in detail below, using an example in which an electric resistance welded clad steel pipe or tube is a two-layer clad steel pipe or tube (Embodiment 1) and an example in which an electric resistance welded clad steel pipe or tube is a three-layer clad steel pipe or tube (Embodiment 2).

Embodiment 1

An example in which an electric resistance welded clad steel pipe or tube is a two-layer clad steel pipe or tube will be described first.

[Electric Resistance Welded Clad Steel Pipe or Tube]

An electric resistance welded clad steel pipe or tube 20 according to Embodiment 1 of the present disclosure will be described below, with reference to FIG. 1. The electric resistance welded clad steel pipe or tube 20 according to this embodiment is a two-layer electric resistance welded clad steel pipe or tube (hereafter also simply referred to as "clad steel pipe or tube") composed of a first layer 11 made of base metal and a second layer 12 made of cladding metal.

Herein, "base metal" denotes the material of the thicker layer of two layers constituting a clad steel pipe or tube, and "cladding metal" denotes the material of the thinner layer.

In the present disclosure, low-carbon steel or low-alloy steel which is a material with excellent mechanical strength is used as the base metal, and stainless steel or a nickel-containing alloy which is a material with excellent corrosion resistance is used as the cladding metal. Combining two types of materials in this way makes it possible to obtain a steel pipe or tube having both strength and corrosion resistance. Moreover, the production cost can be reduced as compared with the case where the whole steel pipe or tube is made of stainless steel or a nickel-containing alloy.

(Base Metal)

In the present disclosure, low-carbon steel or low-alloy steel is used as the base metal.

The carbon steel is not limited, and may be any carbon steel. It is, however, preferable to select a carbon steel whose specifications and mechanical properties are appropriate to the application of the electric resistance welded clad steel pipe or tube, because the mechanical properties of the electric resistance welded clad steel pipe or tube depend on the properties of the base metal occupying the major portion of the pipe or tube volume. Herein, "low-carbon steel" denotes a carbon steel whose C content is 0.25 mass % or less.

The low-alloy steel is not limited and may be any steel as long as its total content of alloying elements is 5 mass % or less. A low-alloy steel may be selected according to the application of the electric resistance welded clad steel pipe or tube, as with the carbon steel.

The chemical composition of low-carbon steel and low-alloy steel suitable as the base metal will be described in more detail below. Herein, "%" denotes "mass %" unless otherwise noted.

In one of the disclosed embodiments, the base metal may be carbon steel or low-alloy steel having a chemical composition containing C: 0.02% to 0.20%, Si: 0.01% to 1.0%, Mn: 0.1% to 2.0%, P: 0.05% or less, S: 0.01% or less, and Al: 0.1% or less, with the balance being Fe and inevitable impurities.

The reasons for limiting the content of each element will be explained below.

C: 0.02% to 0.20%

C is a necessary element to improve the strength of the steel. If the C content is less than 0.02%, it is difficult to achieve strength required of the base metal. The C content is therefore 0.02% or more. The C content is preferably 0.03% or more. If the C content is more than 0.20%, martensite tends to form during heat treatment such as welding, making the material brittle. The C content is therefore 0.20% or less. The C content is preferably 0.15% or less.

Si: 0.01% to 1.0%

Si is an element used for deoxidation and strength adjustment of the steel. If the Si content is less than 0.01%, the effect is insufficient. The Si content is therefore 0.01% or more. If the Si content is more than 1.0%, the material hardens, and the toughness decreases. The Si content is therefore 1.0% or less. The Si content is preferably 0.8% or less.

Mn: 0.1% to 2.0%

Mn is a useful element to adjust the strength of the steel. If the Mn content is less than 0.1%, the effect is insufficient. The Mn content is therefore 0.1% or more. If the Mn content is more than 2.0%, problems such as a decrease in weldability and an increase of inclusions arise. The Mn content is therefore 2.0% or less. The Mn content is preferably 1.8% or less.

P: 0.05% or Less

P is an element that exists in the steel as an impurity and segregates to crystal grain boundaries or the like to cause a decrease in properties such as toughness. The P content is desirably as low as possible, but 0.05% or less P is allowable. The P content is therefore 0.05% or less. The P content is preferably 0.03% or less. Excessively reducing the P content leads to excessively high refining cost while the effect lessens. Accordingly, the P content is preferably 0.001% or more.

S: 0.01% or Less

S is an element that exists in the steel as an impurity and segregates to crystal grain boundaries or the like to cause a decrease in properties such as toughness. The S content is desirably as low as possible, but 0.01% or less S is allowable. The S content is therefore 0.01% or less. The S content is preferably 0.005% or less. Excessively reducing the S content leads to excessively high refining cost while the effect lessens. Accordingly, the S content is preferably 0.001% or more.

Al: 0.1% or Less

Al is an element used for deoxidation of the steel. If the Al content is more than 0.1%, a large amount of Al oxide forms, and decreases the cleanliness of the steel. The Al content is therefore 0.1% or less. Although no lower limit is placed on the Al content, if the Al content is less than 0.001%, the deoxidation effect is unlikely to be achieved, and thus the Al content is preferably 0.001% or more.

In one of the disclosed embodiments, the chemical composition of the base metal may further contain one or more selected from the group consisting of Ti: 0.1% or less,
Nb: 0.2% or less,
Cu: 0.5% or less,
Ni: 0.5% or less,
Cr: 0.5% or less,
Mo: 0.5% or less,
V: 0.1% or less, and
Ca: 0.0005% to 0.0050%.

Ti: 0.1% or Less, Nb: 0.2% or Less, Cr: 0.5% or Less, Mo: 0.5% or Less, V: 0.1% or Less Ti, Nb, Cr, Mo, and V each have an effect of improving the strength of the steel by forming carbide or dissolving in the steel. If the contents of the respective elements are more than 0.1%, 0.2%, 0.5%, 0.5%, and 0.1%, the toughness decreases. Accordingly, the contents of the respective elements are limited to 0.1% or less, 0.2% or less, 0.5% or less, 0.5% or less, and 0.1% or less. If the content of each element is less than 0.01%, the effect is unlikely to be achieved. Accordingly, in the case of containing any of these elements, the content of each element is preferably 0.01% or more.

Cu: 0.5% or Less, Ni: 0.5% or Less

Cu and Ni each have an effect of improving the strength of the steel through quench hardenability improvement. If the content of each element is more than 0.5%, the effect is saturated, and an unnecessary cost increase ensues. The content of each element is therefore limited to 0.5% or less. Although no lower limit is placed on the content of each element, if the content of each element is less than 0.01%, the effect is unlikely to be achieved. Accordingly, in the case of containing any of these elements, the content of each element is preferably 0.01% or more.

Ca: 0.0005% to 0.0050%

Ca is an element that contributes to inclusion morphological control of transforming elongated coarse sulfide into spherical sulfide. If the Ca content is less than 0.0005%, the effect is insufficient. Accordingly, in the case of containing Ca, the Ca content is 0.0005% or more. The Ca content is preferably 0.0010% or more. If the Ca content is more than 0.0050%, the cleanliness of the steel decreases. The Ca content is therefore 0.0050% or less.

(Cladding Metal)

In the present disclosure, stainless steel or a nickel-containing alloy is used as the cladding metal.

The stainless steel is not limited, and may be any stainless steel. In terms of corrosion resistance, austenitic stainless steel is preferable, and SUS316L is more preferable.

The nickel-containing alloy may be any alloy containing Ni. Preferable examples of the nickel-containing alloy include Alloy625 and Alloy825.

The chemical composition of stainless steel or a nickel-containing alloy suitable as the cladding metal will be described in more detail below.

In one of the disclosed embodiments, the cladding metal may be stainless steel having a chemical composition containing C: 0.15% or less,
Si: 5.0% or less,
Mn: 2.0% or less,
P: 0.1% or less,
S: 0.1% or less,
Ni: 1.0% or less,
Cr: 11.0% or more, and
N: 0.5% or less,
with the balance being Fe and inevitable impurities.

C: 0.15% or Less

C has an effect of improving the strength of the stainless steel. If the C content is more than 0.15%, martensite tends to form during heat treatment such as welding, making the material brittle. The C content is therefore limited to 0.15% or less. The C content is preferably 0.1% or less. Excessively reducing the C content leads to excessively high refining cost while the effect lessens. Accordingly, the C content is preferably 0.001% or more.

Si: 5.0% or Less

Si is an element that contributes to improved corrosion resistance of the stainless steel. If the Si content is more than 5.0%, however, the material hardens, and the toughness decreases. The Si content is therefore 5.0% or less. The Si content is preferably 3.0% or less. Si is an element which inevitably mixes in from the raw material and is hard to be removed. The Si content is therefore preferably 0.01% or more.

Mn: 2.0% or Less

Mn is a useful element to adjust the strength of the steel. If the Mn content is more than 2.0%, however, problems such as a decrease in weldability and an increase of inclusions arise. The Mn content is therefore 2.0% or less. The Mn content is preferably 1.8% or less. Although no lower limit is placed on the Mn content, the Mn content is preferably 0.1% or more because Mn has an effect of suppressing grain boundary segregation of S by combining with S inevitably mixed in.

P: 0.1% or Less

P is an element that exists in the stainless steel as an impurity and segregates to crystal grain boundaries or the like to cause a decrease in properties such as toughness. The P content is desirably as low as possible, but 0.1% or less P is allowable. The P content is more preferably 0.05% or less. Excessively reducing the P content leads to excessively high refining cost while the effect lessens. Accordingly, the P content is preferably 0.001% or more.

S: 0.1% or Less

S is an element that exists in the stainless steel as an impurity and segregates to crystal grain boundaries or the like to cause a decrease in properties such as toughness. The S content is desirably as low as possible, but 0.1% or less S is allowable. The S content is more preferably 0.05% or less. Excessively reducing the S content leads to excessively high refining cost while the effect lessens. Accordingly, the S content is preferably 0.0001% or more.

Ni: 1.0% or Less

Ni is an element that contributes to improved corrosion resistance of the stainless steel. However, because Ni is an austenite forming element, the Ni content is limited to 1.0% or less in ferritic stainless steel, in order to control the structure to ferrite single phase. Although no lower limit is placed on the Ni content, the Ni content is preferably 0.01% or more in terms of corrosion resistance improvement.

Cr: 11.0% or More

Cr is an important element that forms a passive film on the surface of the stainless steel to maintain corrosion resistance. If the Cr content is less than 11.0%, the effect is insufficient. The Cr content is therefore 11.0% or more. The Cr content is preferably 13.0% or more. Although no upper limit is placed on the Cr content, if the Cr content is more than 35.0%, hot workability tends to decrease, and thus the Cr content is preferably 35.0% or less.

N: 0.5% or Less

N is an element that contributes to improved corrosion resistance of the stainless steel. If the N content is more than 0.5%, however, the effect is saturated. The N content is therefore limited to 0.5% or less. Although no lower limit is placed on the N content, the N content is preferably 0.001% or more to prevent an excessive increase in refining cost.

In another one of the disclosed embodiments, the cladding metal may be stainless steel or a nickel-containing alloy having a chemical composition containing C: 0.15% or less,
Si: 5.0% or less,
Mn: 2.0% or less,
P: 0.1% or less,
S: 0.1% or less,
Ni: 6.0% or more,
Cr: 15.0% or more, and
N: 0.5% or less,
with the balance being Fe and inevitable impurities.

C: 0.15% or Less

C has an effect of improving the strength of the stainless steel or nickel-containing alloy. If the C content is more than 0.15%, martensite tends to form during heat treatment such as welding, making the material brittle. The C content is therefore limited to 0.15% or less. The C content is more preferably 0.1% or less. Although no lower limit is placed on the C content, the C content is preferably 0.001% or more to prevent an excessive increase in refining cost.

Si: 5.0% or Less

Si is an element that contributes to improved corrosion resistance of the stainless steel or nickel-containing alloy. If the Si content is more than 5.0%, the material hardens, and the toughness decreases. The Si content is therefore limited to 5.0% or less. The Si content is more preferably 3.0% or less. Si is an element which inevitably mixes in from the raw material and is hard to be removed. The Si content is therefore preferably 0.01% or more.

Mn: 2.0% or Less

Mn is an austenite forming element, and may be optionally added to control the phase stability of the stainless steel or nickel-containing alloy. If the Mn content is more than 2.0%, however, problems such as a decrease in weldability and an increase of inclusions arise. The Mn content is therefore limited to 2.0% or less. Although no lower limit is placed on the Mn content, the Mn content is preferably 0.1% or more because Mn has an effect of suppressing grain boundary segregation of S by combining with S inevitably mixed in.

P: 0.1% or Less

P is an element that exists in the stainless steel or nickel-containing alloy as an impurity and segregates to crystal grain boundaries or the like to cause a decrease in properties such as toughness. The P content is desirably as low as possible, but 0.1% or less P is allowable. The P content is more preferably 0.05% or less. Excessively reducing the P content leads to excessively high refining cost while the effect lessens. Accordingly, the P content is preferably 0.001% or more.

S: 0.1% or Less

S is an element that exists in the stainless steel or nickel-containing alloy as an impurity and segregates to crystal grain boundaries or the like to cause a decrease in properties such as toughness. The S content is desirably as low as possible, but 0.1% or less S is allowable. The S content is more preferably 0.05% or less. Excessively reducing the S content leads to excessively high refining cost while the effect lessens. Accordingly, the S content is preferably 0.0001% or more.

Ni: 6.0% or More

Ni is an element that contributes to improved corrosion resistance of the stainless steel or nickel-containing alloy. Moreover, since Ni is an austenite forming element, Ni is used to control the phase stability of the stainless steel or nickel-containing alloy based on the balance with a ferrite forming element such as Cr. For this purpose, in the case where the Cr content is 15.0% or more, the Ni content is limited to 6.0% or more. Although no upper limit is placed on the Ni content, the Ni content is preferably 80% or less to prevent an increase in cost.

Cr: 15.0% or More

Cr is an important element that forms a passive film on the surface of the stainless steel or nickel-containing alloy to maintain corrosion resistance.

Moreover, since Cr is a ferrite forming element, Cr is used to control the phase stability of the stainless steel or nickel-containing alloy based on the balance with an austenite forming element such as Ni. For this purpose, in the case where the Ni content is 6.0% or more, the Cr content is limited to 15.0% or more. Although no upper limit is placed on the Cr content, the Cr content is preferably 80% or less to prevent an increase in cost.

N: 0.5% or Less

N is an element that contributes to improved corrosion resistance of the stainless steel. If the N content is more than 0.5%, however, the effect is saturated. The N content is therefore limited to 0.5% or less. Although no lower limit is placed on the N content, the N content is preferably 0.001% or more to prevent an excessive increase in refining cost.

In one of the disclosed embodiments, the chemical composition of the cladding metal may further contain one or more selected from the group consisting of Mo: 20.0% or less,
Cu: 5.0% or less,
Al: 2.0% or less,
Co: 3.0% or less,
W: 5.0% or less, and
Ta: 5.0% or less.

Mo: 20.0% or Less, Cu: 5.0% or Less, Al: 2.0% or Less, Co: 3.0% or Less, W: 5.0% or Less, Ta: 5.0% or Less Mo, Cu, Al, Co, W, and Ta may be added to improve the corrosion resistance or strength of the stainless steel or nickel alloy. If the contents of the respective elements are more than 20.0%, 5.0%, 2.0%, 3.0%, 5.0%, and 5.0%, however, the effect is saturated. The contents of the respective elements are therefore limited to 20.0% or less, 5.0% or less, 2.0% or less, 3.0% or less, 5.0% or less, and 5.0% or less. To achieve the effect, the content of each of these elements is preferably 0.005% or more.

In one of the disclosed embodiments, the chemical composition of the cladding metal may further contain one or more selected from the group consisting of Ti: 2.0% or less,
Nb: 5.0% or less,
V: 2.0% or less, and
Zr: 2.0% or less.

Ti: 2.0% or Less, Nb: 5.0% or Less, V: 2.0% or Less, Zr: 2.0% or Less

Ti, Nb, V, and Zr each have an effect of suppressing sensitization by fixing C, and thus may be optionally added. However, in a range of C: 0.15% or less, if the contents of the respective elements are more than 2.0%, 5.0%, 2.0%, and 2.0%, the effect is saturated. The contents of the respective elements are therefore limited to 2.0% or less, 5.0% or less, 2.0% or less, and 2.0% or less. To achieve the effect, the content of each of these elements is preferably 0.001% or more.

In one of the disclosed embodiments, the chemical composition of the cladding metal may further contain one or more selected from the group consisting of B: 0.0050% or less,
Ca: 0.0050% or less,
Mg: 0.0030% or less, and
REM: 0.10% or less.

B is an element that contributes to improved properties such as toughness through grain boundary strengthening, and Ca, Mg, and REM (rare-earth metal) are each an element that contributes to improved properties such as toughness through inclusion morphological control. If the contents of the respective elements are more than 0.0050%, 0.0050%, 0.0030%, and 0.10%, however, the effect is saturated, or the cleanliness decreases. The contents of the respective elements are therefore limited to 0.0050% or less, 0.0050% or less, 0.0030% or less, and 0.10% or less. To achieve the effect, the content of each of these elements is preferably 0.0001% or more.

Which of the first layer 11 made of the base metal and the second layer 12 made of the cladding metal forms the inner layer of the pipe or tube and which of the first layer 11 and the second layer 12 forms the outer layer of the pipe or tube are not limited, and may be determined depending on the use of the clad steel pipe or tube. For example, in a line pipe used to flow a corrosive fluid, the pipe or tube inner surface is required to have high corrosion resistance. Accordingly, in the case of using the clad steel pipe or tube for a line pipe, the cladding metal may be used as the inner layer and the base metal as the outer layer. In applications where the pipe or tube outer surface is required to have high corrosion resistance, on the other hand, the base metal may be used as the inner layer and the cladding metal as the outer layer.

(Exposure of Base Metal)

Figure 15A:
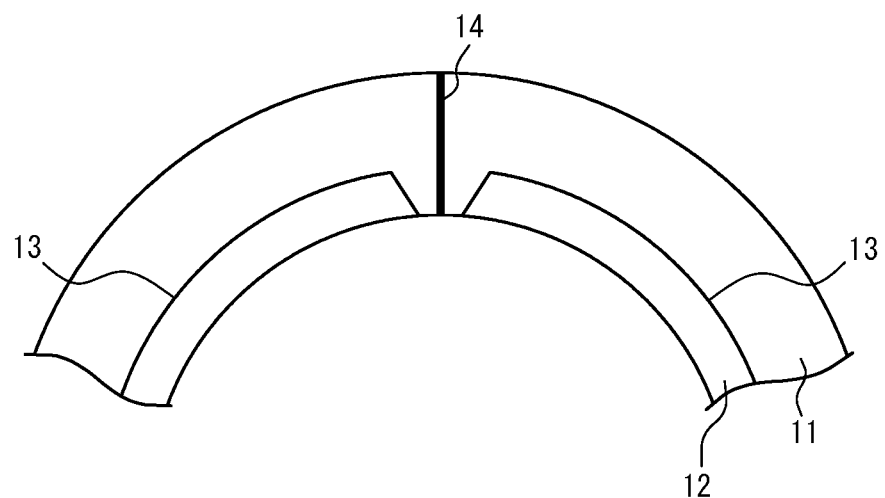
FIG. 15A is a schematic sectional diagram of an electric resistance weld and its vicinity in the case where a two-layer clad steel sheet is used as raw material and the amount of upset is large.

In the clad steel pipe or tube according to this embodiment, the base metal is not exposed at the cladding metal-side surface in the weld. If the base metal is exposed to the cladding metal side as illustrated in FIG. 15A, the properties such as corrosion resistance in the exposed part decrease. This makes it impossible to achieve performance originally expected as a clad steel pipe or tube. In the present disclosure, the base metal is not exposed at the cladding metal-side surface, so that the function as a clad steel pipe or tube is not impaired.

(Solidification Microstructure)

In the clad steel pipe or tube according to this embodiment, no solidification microstructure is contained in each of circular sections of 0.1 mm in radius respectively centered at the following positions (i) to (iii) in a plane perpendicular to the pipe or tube longitudinal direction:

(i) a position that is 1 mm in depth from the outer surface of the electric resistance welded clad steel pipe or tube in the weld and is 0.3 mm in the transverse direction of the weld metal from the center of the width of the weld metal in the pipe or tube circumferential direction;

(ii) a position that is the center of the electric resistance welded clad steel pipe or tube in the thickness direction in the weld and is 0.3 mm in the transverse direction of the weld metal from the center of the width of the weld metal in the pipe or tube circumferential direction; and (iii) a position that is 1 mm in depth from the inner surface of the electric resistance welded clad steel pipe or tube in the weld and is 0.3 mm in the transverse direction of the weld metal from the center of the width of the weld metal in the pipe or tube circumferential direction.

FIG. 1 illustrates the positions corresponding to (i) to (iii). Weld metal 15A and weld metal 15B formed by electric resistance welding are present in the weld of the electric resistance welded clad steel pipe or tube 20. (i) to (iii) respectively correspond to a position of 1 mm in depth from the outer surface of the clad steel pipe or tube, a position of center ($\frac{1}{2}t$) in the thickness direction of the clad steel pipe or tube, and a position of 1 mm in depth from the inner surface of the clad steel pipe or tube in the weld. These positions (i) to (iii) are 0.3 mm away in the transverse direction of the weld metal from the center 14A of the width of the weld metal in the pipe or tube circumferential direction at the respective depth positions, as indicated by L. Note that FIG. 1 is a schematic diagram for describing the presently disclosed techniques, and is not based on the actual dimensional ratios.

In the present disclosure, no solidification microstructure is contained in each of the circular sections C of 0.1 mm in radius centered at the respective positions (i) to (iii) in a plane perpendicular to the pipe or tube longitudinal direction. Such absence of solidification microstructure in a position near the transverse center 14A of the weld metal, i.e. a position of 0.3 mm from the transverse center 14A of the weld metal, indicates that the width of the site degraded in properties due to welding is limited to a very narrow width. A clad steel pipe or tube satisfying these conditions has excellent mechanical properties such as toughness.

Although the positions (i) to (iii) are illustrated only on one side (right in the drawing) of the weld metal in a section perpendicular to the pipe or tube longitudinal direction in FIG. 1, actually there are also the corresponding positions on the opposite side (left in the drawing) of the weld metal. In the present disclosure, the foregoing conditions need to be satisfied for at least one side, and are preferably satisfied for both sides. Under typical welding conditions, the influence of welding is bilaterally symmetric. Hence, if the conditions according to the present disclosure are satisfied on one side of the weld metal, then it can be assumed that the same conditions are satisfied on the opposite side.

Herein, "weld metal" denotes metal that has melted during welding and subsequently solidified, in a welded pipe or tube. A welded pipe or tube is composed of a weld made up of weld metal and a heat-affected zone surrounding the weld metal, and a non-weld not heat-affected by welding.

In the present disclosure, the weld metal is identified by the following method. A region that reliably includes a weld in a section of the welded pipe or tube perpendicular to the pipe or tube longitudinal direction is etched by an appropriate method, and a region exhibiting morphology different from a non-welded portion is identified as the weld metal. Here, an appropriate etching solution may be selected depending on the type of the metal. For example, for weld metal of carbon steel or low-alloy steel, the section is etched with natal, and a region observed as white by an optical microscope is identified as the weld metal. For weld metal of stainless steel or a Ni-containing alloy, the section is etched with aqua regia, and a region observed as black by an optical microscope and containing solidification microstructure in, for example, dendritic or cellular form is identified as the weld metal. The weld metal 15A of the base metal and the weld metal 15B of the cladding metal in FIG. 1 can thus be identified. The width center position in the circumferential direction at the outer surface of the identified weld metal in the section is determined first. A tangent to the outer surface passing through the width center position at the outer surface is given. The length of a line segment in the direction parallel to the tangential direction is taken to be the width of the weld metal at the depth position of each of (i) to (iii) of the weld metal, and a position of 0.3 mm away from the center of the width in the direction parallel to the tangential direction is taken to be the position of each of (i) to (iii) of the weld metal. Each circular section of 0.1 mm in radius is thus determined.

Weld metal of carbon steel or low-alloy steel may be identified as a region observed to have no segregation line when metal flow is revealed by etching the section with picric acid. Likewise, weld metal of stainless steel or a Ni-containing alloy may be identified as a region observed to have no segregation line when metal flow is revealed.

The term "solidification microstructure" denotes a portion that exhibits microstructure completely different from base metal as a result of being melted during welding and then cooled, and can be easily identified by the observation method described above.

In the present disclosure, whether or not solidification microstructure is included is determined based on an image of a predetermined region taken using an optical microscope at 400 magnifications.

In the present disclosure, it is also preferable to satisfy one of the following conditions (A) and (B):

(A) The first layer is located on the outer side of the electric resistance welded clad steel pipe or tube, and the metallic microstructure at the positions (i) and (ii) is metallic microstructure in which the total area ratio of ferrite and bainite is 90% or more and the average grain size of ferrite and bainite is 15 μm or less.

(B) The first layer is located on the inner side of the electric resistance welded clad steel pipe or tube, and the metallic microstructure at the positions (ii) and (iii) is metallic microstructure in which the total area ratio of ferrite and bainite is 90% or more and the average grain size of ferrite and bainite is 15 μm or less.

These conditions define the metallic microstructure at a position on the side where the first layer made of low-carbon steel or low-alloy steel is located from among the positions (i) to (iii), in addition to the position (ii) which is the sheet thickness center position.

Total Area Ratio of Ferrite and Bainite: 90% or More

As a result of the metallic microstructure at the above-mentioned position being mainly composed of ferrite and bainite, a steel pipe or tube excellent in strength, toughness, and ductility even in a weld can be obtained. No upper limit is placed on the total area ratio, and the upper limit may be 100%.

Average Grain Size of Ferrite and Bainite: 15 μm or Less

As a result of the average grain size of ferrite and bainite being 15 μm or less, a steel pipe or tube having excellent strength and toughness in a weld can be obtained. The average grain size is more preferably 12 μm or less. No lower limit is placed on the average grain size, yet the average grain size is 0.5 μm or more in industrial terms.

[Production Method]

The above-described clad steel pipe or tube according to Embodiment 1 of the present disclosure can be produced by electric resistance welding under specific conditions described below.

A process of producing a clad steel pipe or tube according to one of the disclosed embodiments is described below, with reference to FIG. 2. The production of a clad steel pipe or tube according to one of the disclosed embodiments includes the following steps: First, a clad steel strip 10 in the form of a hot rolled coil is continuously uncoiled by an uncoiler 30. After this, both transverse ends of the uncoiled clad steel strip 10 are subjected to groove machining by a groove machine 40. The clad steel strip 10 is then formed into a pipe or tube shape by a roll former 50. Following this, the transverse ends as butted parts (parts to be welded) are, while being heated to a melting point or more by a high-frequency heating device 60, butt pressed by squeeze rolls 70 to be electric resistance welded, thus obtaining an electric resistance welded clad steel pipe or tube 20. During this, the butted parts are subjected to gas shielding by a shielding-gas blowing device 80. After this, the weld bead on the outer surface and inner surface of the weld is cut by a bead cutter

90. Subsequently, the electric resistance welded clad steel pipe or tube 20 is cut to a predetermined length by a cutter 96.

The high-frequency heating device 60 may be any of a direct current heating device and an induction heating device. Electric resistance welding may be performed with an impeder (not illustrated) inserted on the pipe or tube inner surface side within a pipe or tube passage direction region including a current passage portion of high-frequency current.

Figure 2:
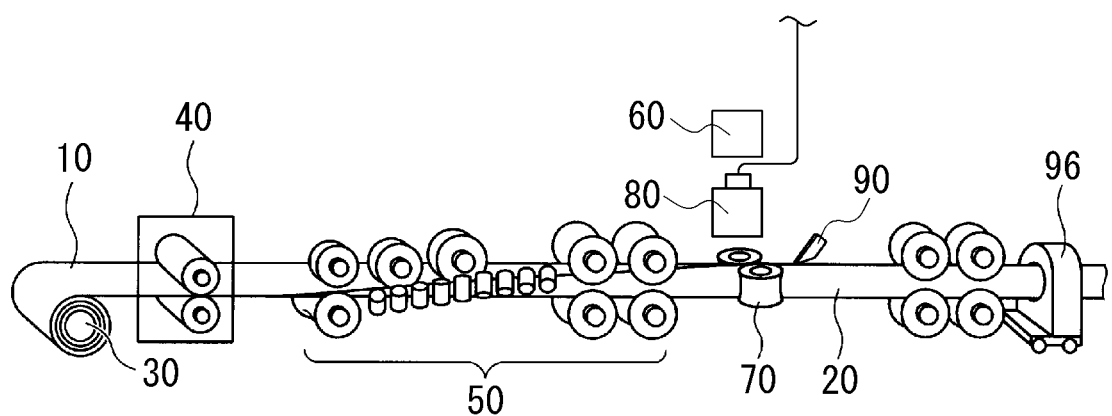
FIG. 2 is a schematic diagram of a line usable for producing an electric resistance welded clad steel pipe or tube in Embodiments 1 and 2 of the present disclosure.

This embodiment describes an example in which electric resistance welding is performed using the clad steel strip 10 obtained by pressure-bonding the first layer 11 made of the base metal and the second layer 12 made of the cladding metal where the second layer 12 as the cladding metal is the inner layer and the first layer 11 as the base metal is the outer layer, as illustrated in FIG. 2.

(Groove Machining)

In this embodiment, both transverse ends of the clad steel strip are subjected to groove machining to form a groove. This groove machining will be described below, with reference to FIG. 3A.

Figure 3A:
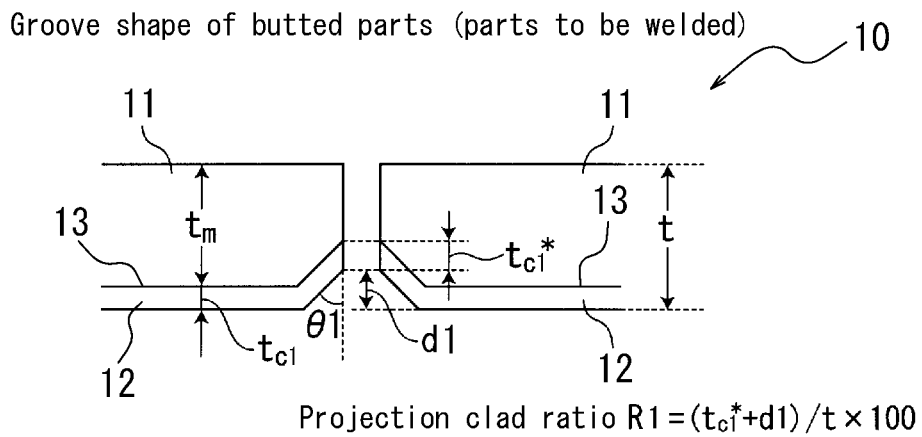
FIG. 3A is a sectional diagram illustrating a groove shape of both transverse ends (butted parts) of a clad steel strip in Embodiment 1 of the present disclosure.
Figure 3B:
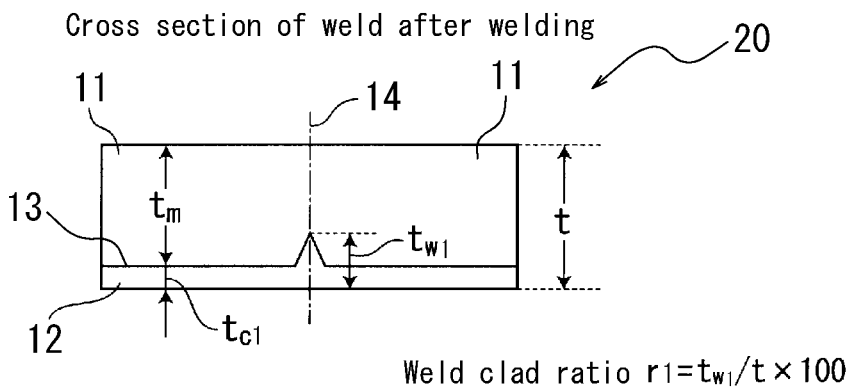
FIG. 3B is a sectional diagram illustrating the weld and its vicinity after electric resistance welding the clad steel strip.

In the groove machining, both transverse ends of the clad steel strip 10 are indented from the second layer 12 side. The groove formed is a Y-groove as illustrated in FIG. 3A, and satisfies the following conditions (i) to (iv):

(i) A clad interface 13 which is the interface between the second layer 12 and the first layer 11 turns from the second layer side toward the thickness center of the clad steel strip.

(ii) The bevel angle $\theta 1$ on the second layer side is 10° or more and 50° or less.

(iii) The groove depth d1 is 10% or more and 45% or less of the thickness t of the clad steel strip.

(iv) The projection clad ratio R1 defined by the following Expression (1) is 25% or more and 50% or less:

$$R1=(t_{c1}*+d1)/t \times 100(\%) \quad (1)$$

where R1 is the projection clad ratio, $t_{c1}*$ is the thickness (mm) of the second layer at the root surface, d1 is the groove depth (mm) on the second layer side, and t is the thickness (mm) of the clad steel strip.

It is important that the Y-groove is formed by indenting the transverse ends of the clad steel strip 10 from the second layer 12 side, and not by cutting off the second layer-side corners of the transverse ends of the clad steel strip 10. As a result, the clad interface 13 is indented from the second layer side toward the thickness center of the clad steel strip. In addition, the bevel angle $\theta 1$, the groove depth d1, and the projection clad ratio R1 are set to the foregoing ranges. Thus, the entry of the molten steel and the heat-affected zone of the base metal into the welded seam part of the cladding metal after electric resistance welding can be suppressed. Consequently, the base metal is kept from being exposed at the cladding metal-side surface of the steel pipe or tube (the inner surface in this embodiment) in the weld. This makes it possible to obtain an electric-resistance-welded clad steel pipe or tube whose inner surface is entirely, including the weld, covered with the cladding metal, after cutting the inner surface bead of the weld.

Moreover, since the groove shape has no corners at which current concentrates, the temperature distribution of the whole parts to be welded is uniform. This facilitates discharging of penetrators from the weld, and thus prevents a decrease in the toughness and strength of the weld.

If the bevel angle $\theta 1$ is less than 10°, the uniformity of the temperature distribution of the whole parts to be welded cannot be maintained, as a result of which discharging of penetrators tends to be insufficient. This causes insufficient properties such as toughness and strength of the weld.

If the bevel angle $\theta 1$ is more than 50°, the effect of suppressing the entry of the molten steel and the heat-affected zone of the base metal into the welded seam part of the cladding metal is insufficient. Consequently, the base metal is more likely to be exposed at the cladding metal-side surface of the steel pipe or tube in the weld.

If the groove depth d1 is less than 10% of the thickness t of the clad steel strip, the effect of suppressing the entry of the molten steel and the heat-affected zone of the base metal into the welded seam part of the cladding metal is insufficient. Consequently, the base metal is more likely to be exposed at the cladding metal-side surface of the steel pipe or tube in the weld.

If the groove depth d1 is more than 45% of the thickness t of the clad steel strip, the composition of the weld is a high-alloy composition similar to the composition of the cladding metal. This causes insufficient properties such as toughness and strength of the weld.

In terms of achieving both the prevention of the exposure of the base metal at the cladding metal-side surface and the prevention of a decrease in the properties of the weld at higher level, the bevel angle $\theta 1$ is preferably 15° or more, the bevel angle $\theta 1$ is preferably 35° or less, the groove depth d1 is preferably 15% or more of the thickness t of the clad steel strip, and the groove depth d1 is preferably 35% or less of the thickness t of the clad steel strip.

It is also very important in this embodiment that the projection clad ratio R1 defined by Expression (1) is 25% or more and 50% or less. If the projection clad ratio R1 is less than 25%, the effect of suppressing the entry of the molten steel and the heat-affected zone of the base metal into the welded seam part of the cladding metal is insufficient. Consequently, the base metal is exposed at the cladding metal-side surface of the steel pipe or tube in the weld. If the projection clad ratio R1 is more than 50%, that is, if the position of the clad interface at the root surface of the Y-groove is on the base metal side of the wall thickness center of the clad steel strip 10, the most part of the welded seam 14 after electric resistance welding is a welded seam resulting from electric resistance welding the metal of high-alloy composition as the cladding metal, so that the properties of the weld such as toughness and strength decrease.

With the groove shape satisfying all of these conditions, the molten base metal can be prevented from being exposed at the cladding metal-side surface, and the mechanical properties of the weld can be improved.

Figure 4:
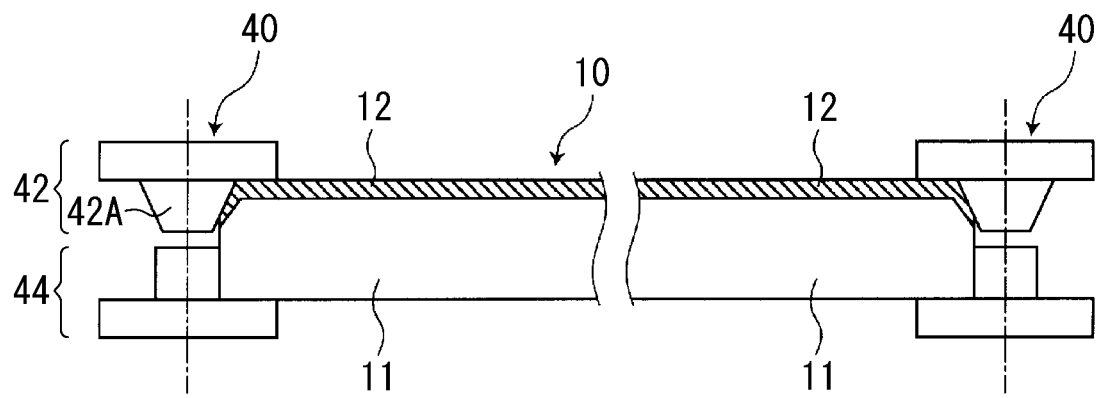
FIG. 4 is a schematic diagram illustrating a groove machine (beveling machine) usable in Embodiment 1 of the present disclosure.

The groove machining in this embodiment can be performed using, for example, a groove machine 40 illustrated in FIG. 4. The groove machine 40 is a rolling-type groove machine capable of continuously machining the running clad steel strip 10, and includes a pair of right and left upper side rolls 42 and a pair of right and left lower side rolls 44. As a result of the upper side rolls 42 having a rolling portion 42A that increases in diameter upward in reverse taper shape as illustrated in FIG. 4, the Y-groove can be formed at both transverse ends of the clad steel strip 10.

By changing the reverse taper shape of the rolling portion 42A, the groove shape of the transverse ends of the clad steel strip can be adjusted as desired. As illustrated in FIG. 3A, the projection clad ratio R1 depends on the ratio of the thickness $t_m$ of the first layer (base metal) and the thickness $t_{c1}$ of the second layer (cladding metal) in the clad steel strip 10 and the groove shape by the indentation. Accordingly, the projection clad ratio R1 can be set to a desired value by selecting the ratio appropriately and also adjusting the reverse taper shape of the rolling portion 42A or 44A to form an appropriate groove shape.

(Gas Shielding)

Figure 5A:
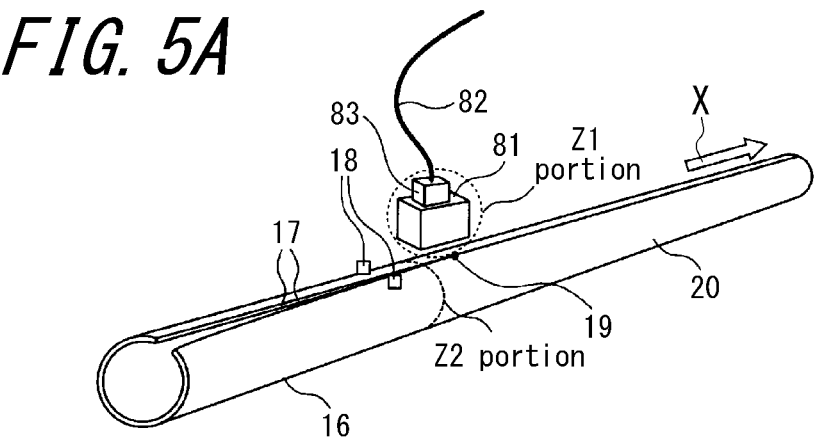
FIG. 5A is a schematic diagram for explaining gas shielding in Embodiment 1 of the present disclosure, and is a perspective diagram of an open pipe or tube 16 and the electric resistance welded clad steel pipe or tube 20 which are being transferred.
Figure 5B:
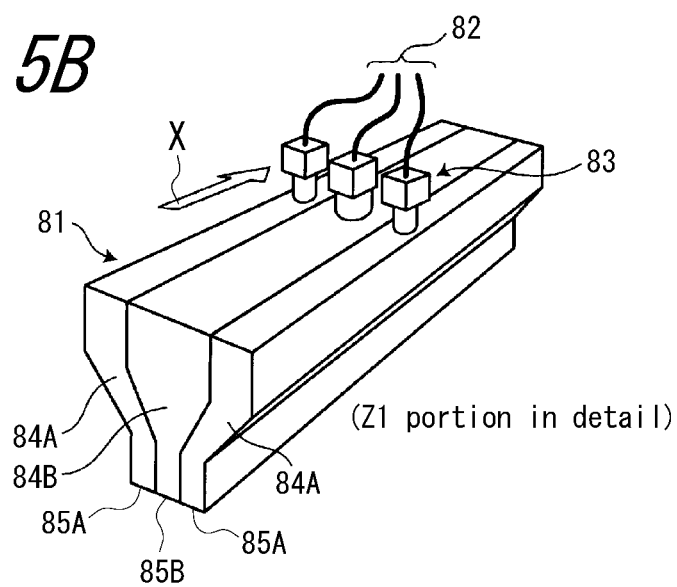
FIG. 5B is a schematic diagram for explaining gas shielding, and is an enlarged perspective diagram of a shielding-gas blowing nozzle 81 in a Z1 portion in FIG. 5A.
Figure 5C:
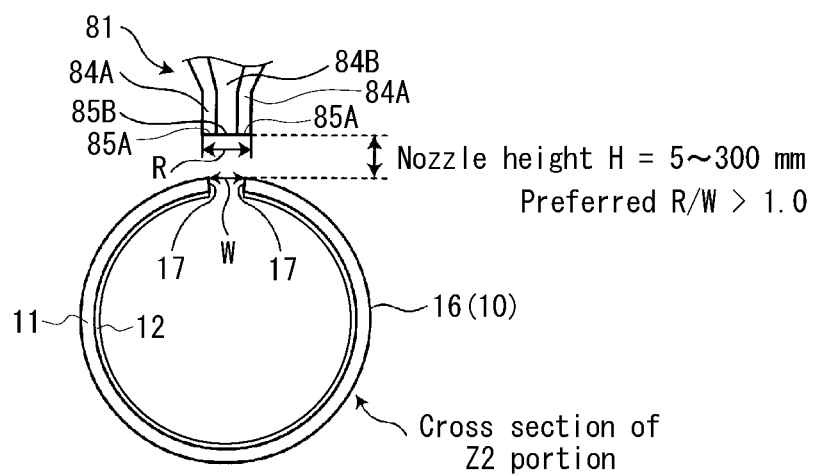
FIG. 5C is a schematic diagram for explaining gas shielding, and is a sectional diagram of a Z2 portion in FIG. 5A.

Next, as illustrated in FIGS. 5A and 5C, the clad steel strip 10 is formed into a pipe or tube shape, to obtain an open pipe or tube 16 that is a cylindrical strip before welding. A pair of butted parts (parts to be welded) 17 of the open pipe or tube facing each other are, while being subjected to gas shielding, butt pressed and electric resistance welded, to obtain the electric resistance welded clad steel pipe or tube 20.

In FIG. 5A, reference sign 18 is the butted part heating starting point of the open pipe or tube, and reference sign 19 is the welding point representing the position in the pipe or tube passage direction at which the parts 17 to be welded are joined. In this embodiment, the entire region in the pipe or tube passage direction from the heating starting point 18 to the welding point 19 or a zone within that region where oxides tend to form in parts to be welded (this zone can be located by preliminary investigation) is defined as the shielding range in the electric resistance welding, and a shielding-gas blowing nozzle 81 (hereafter also simply referred to as "nozzle") is placed directly above the parts 17 to be welded in the shielding range.

The nozzle 81 is split into three layers in the open pipe or tube butting direction Y, as illustrated in FIGS. 5B, 6A, and 6D. Alternatively, the nozzle 81 may be split into four or more layers in the open pipe or tube butting direction Y, as illustrated in FIGS. 6B and 6C. Thus, the nozzle 81 has three or more split nozzles arranged in parallel with and adjacent to each other in the open pipe or tube butting direction Y. The three or more split nozzles are made up of a pair of first split nozzles 84A located at both ends and a remaining second split nozzle (or nozzles) 84B. Each split nozzle is hollow inside, and forms a gas flow path independent of the other split nozzles. Each of the split nozzles 84A and 84B is supplied with shielding gas from a corresponding gas pipe 82, and the amount of the gas supplied is controlled by a gas flow adjusting device 83. The tip of each of the pair of first split nozzles 84A defines a slit-shaped first gas outlet 85A, and the tip of each second split nozzle 84B defines a slit-shaped second gas outlet 85B. The nozzle 81 is placed so that the gas outlets 85A and 85B face the upper ends of the parts 17 to be welded.

We examined in detail the flow of the shielding gas. We also researched in detail the influence of various shielding gas blowing conditions, such as the position and size of each of the gas outlets 85A and 85B and the flow rate of the shielding gas through each of the gas outlets 85A and 85B, on the oxygen concentration around the parts 17 to be welded during electric resistance welding and the oxide area ratio in the weld formed by electric resistance welding the parts to be welded.

We consequently discovered that, under the optimum shielding gas blowing conditions, the oxygen concentration around the parts to be welded is 0.01 mass % or less, and as a result the oxide area ratio in the weld is less than 0.1%, with it being possible to obtain a weld having excellent fracture property. Herein, the oxide area ratio in the weld is defined as follows: A fracture surface formed by subjecting an electric resistance weld to a Charpy impact test is observed for at least 10 observation fields at 500 or more magnifications using an electron microscope. The total area of oxide-containing dimple fracture surface areas found in the fracture surface is measured, and the ratio of this total area to the total observation field area is taken to be the oxide area ratio.

The determined optimum conditions are as follows: The nozzle height H, i.e. the height from the upper ends of the parts 17 to be welded to the gas outlets 85A and 85B, is 5 mm or more and 300 mm or less (see FIG. 5C), and the shielding gas is blown under the conditions that B is 0.5 m/s to 50 m/s and 0.010≤B/A≤10, where A (m/s) is the gas release flow rate from the pair of first gas outlets 85A located at both ends, and B (m/s) is the gas release flow rate from the remaining second gas outlet (or outlets) 85B. We also discovered that the width of the weld can be sufficiently reduced and a clad steel pipe or tube not containing solidification microstructure in each of the positions (i) to (iii) can be obtained by employing these gas shielding conditions in addition to the above-described groove machining conditions.

If the nozzle height H is more than 300 mm, the amount of shielding gas reaching the parts 17 to be welded is insufficient, so that the oxygen concentration around the parts 17 to be welded is more than 0.01 mass %, and a weld having excellent fracture property cannot be obtained. If the nozzle height H is less than 5 mm, radiant heat from the parts 17 to be welded being heated tends to damage the gas outlets 85A and 85B, and also a spatter from the parts 17 to be welded collides with the nozzle 81 and decreases the durability of the nozzle 81.

If the flow rate B is excessively low, the shielding gas spreads out and the gas shielding of the parts 17 to be welded is insufficient, so that the oxygen concentration around the parts 17 to be welded is more than 0.01 mass % and a weld having excellent fracture property cannot be obtained. If the flow rate B is excessively high, the shielding gas blows too intensely and causes air entrainment between the end surfaces of the parts 17 to be welded. The appropriate range of the flow rate B is therefore 0.5 m/s to 50 m/s. In the case where there are a plurality of second gas outlets 85B at the center (e.g. FIGS. 6B and 6C), the flow rates B at the respective second gas outlets need not necessarily be the same, and may be different from each other as long as the flow rates B are within the appropriate range.

Even when the flow rate B is within the appropriate range, however, if the gas flow rate ratio B/A, i.e. the ratio between the flow rate B and the flow rate A, is inappropriate, air entrainment 87 occurs as illustrated in FIGS. 7A to 7C.

As illustrated in FIG. 7A, in the case where B/A<0.010, the gas flows from the first gas outlets 85A at both ends are too intense, and the gas flow from the second gas outlet 85B at the center is too weak. Accordingly, the gas flows from the first gas outlets 85A at both ends reflect off the outer surface of the open pipe or tube 16, and deflect upward. This causes the gas flow rate in the reflection region to be close to 0, as a result of which air entrainment 87 occurs along the outer surface of the open pipe or tube 16. Consequently, the oxygen concentration around the parts 17 to be welded cannot be reduced sufficiently, and a weld having excellent fracture property cannot be obtained.

As illustrated in FIG. 7C, in the case where B/A>10, the gas flow from the second gas outlet 85B at the center is too intense, and the gas flows from the first gas outlets 85A at both ends are too weak. Accordingly, the gas flow from the second gas outlet 85B at the center draws air into the gap between the end surfaces of the parts 17 to be welded, and facilitates air entrainment 87. Consequently, the oxygen concentration around the parts 17 to be welded cannot be reduced sufficiently, and a weld having excellent fracture property cannot be obtained.

As illustrated in FIG. 7B, in the case where $0.010 \leq B/A \leq 10$, shielding gas 86 sufficiently but not excessively fills the gap between the end surfaces of the parts 17 to be welded, without air entrainment. Consequently, the oxygen concentration around the parts 17 to be welded is 0.01 mass % or less, and a weld having excellent fracture property can be obtained. In the case where there are a plurality of second gas outlets 85B at the center and the flow rates at the respective second gas outlets are different from each other, B/A calculated using the maximum one of the flow rates as the "flow rate B" is to satisfy the above-mentioned conditions.

Figure 8:
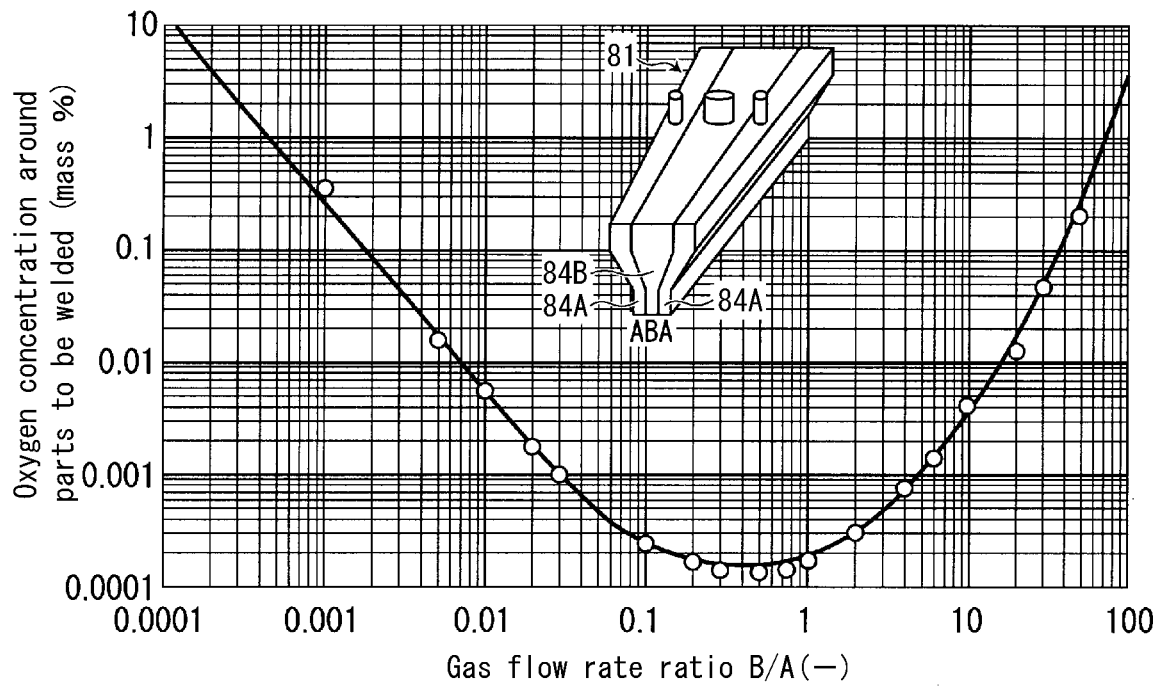
FIG. 8 is a graph illustrating the relationship between the gas flow rate ratio B/A of the shielding gas and the oxygen concentration around the parts to be welded.

FIG. 8 is a graph illustrating, as an example, the results of measuring the oxygen concentration at an intermediate position between the end surfaces of the parts 17 to be welded. The shielding gas 86 was blown over the parts 17 to be welded, with a nozzle height H of 50 mm and varying gas flow rate ratios B/A within the appropriate range of $0.5 \leq B \leq 50$. A stainless clad steel strip having low-carbon low-alloy steel with a thickness of 16 mm as the base metal on the pipe or tube outer surface side and austenitic stainless steel (SUS316L) with a thickness of 4 mm as the cladding metal on the pipe or tube inner surface side was used.

As illustrated in FIG. 8, an oxygen concentration of 0.01 mass % or less around the parts to be welded can be well (i.e. reliably) achieved by controlling the gas flow rate ratio B/A to $0.010 \leq B/A \leq 10$ within the appropriate range of $0.5 \leq B \leq 50$. Moreover, as illustrated in FIG. 8, $0.03 \leq B/A \leq 5$ is preferable because a lower oxygen concentration level of 0.001 mass % to 0.0001 mass % can be achieved.

We confirmed that the same results were obtained even when other conditions such as the nozzle height H were changed.

Figure 9:
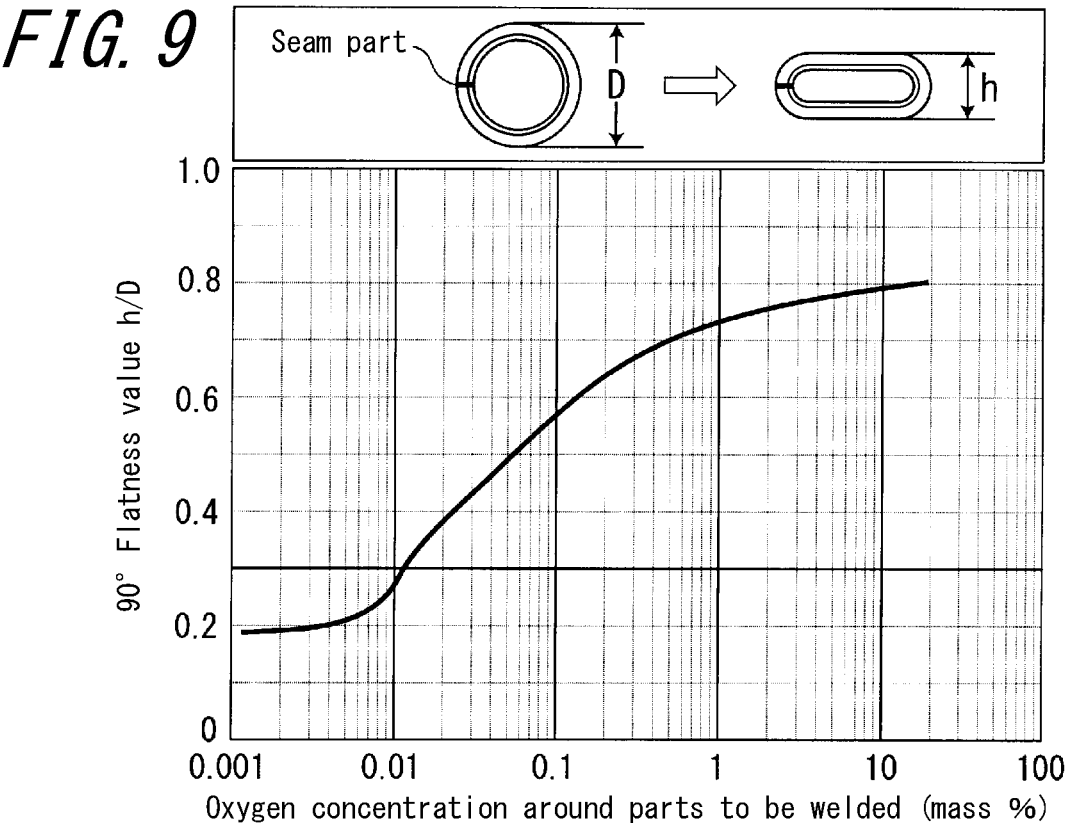
FIG. 9 is a graph illustrating the relationship between the oxygen concentration around the parts to be welded and the flatness value h/D of the electric-resistance-welded stainless clad steel pipe or tube in a 90° flattening test.

FIG. 9 is a graph illustrating the relationship between the oxygen concentration around the parts to be welded and the flatness value h/D of each clad steel pipe or tube in a 90° flattening test. The data in the graph was obtained by the following procedure. First, a stainless clad steel strip was electric resistance welded with each of various oxygen concentrations around the parts to be welded, to produce an electric-resistance-welded stainless clad steel pipe or tube. As the stainless clad steel strip, a clad steel strip composed of a first layer having a thickness of 5 mm and made of low-carbon low-alloy steel as base metal and a second layer having a thickness of 2 mm and made of austenitic stainless steel (SUS316L) as cladding metal was used. The electric-resistance-welded stainless clad steel pipe or tube was produced to have the first layer on the pipe or tube outer surface side and the second layer on the pipe or tube inner surface side. In the electric resistance welding, the amount of upset was limited to 1.0 mm which is not greater than the thickness of the stainless clad steel strip so as to prevent the base metal from being exposed at the pipe or tube inner surface, as illustrated in FIG. 15A. A test piece of 50 mm in length was then collected from the obtained electric-resistance-welded stainless clad steel pipe or tube, and a 90° flattening test in accordance with JIS G 3445 was performed to obtain the flatness value h/D.

As illustrated in FIG. 9, each electric-resistance-welded stainless clad steel pipe or tube produced in an atmosphere of an oxygen concentration of 0.01 mass % or less around the parts to be welded showed a flatness value h/D (h: flattening crack height, D: pipe or tube outer diameter) of less than 0.3 in the 90° flattening test, i.e. had a weld with excellent fracture property.

The combined shape of all of the gas outlets 85A and 85B is preferably a rectangular shape whose length, i.e. an X component of the size in the pipe or tube passage direction, is 30 mm or more and width (total width R in FIG. 5C), i.e. a Y component of the size in a butting direction of the open pipe or tube, is 5 mm or more. Such a shape contributes to more uniform gas blowing over the parts 17 to be welded.

It is also preferable to satisfy R/W>1.0, where R is the total width of all of the gas outlets 85A and 85B, and W is the maximum distance between the butted parts of the open pipe or tube directly below the gas outlets, as illustrated in FIG. 5C. This allows for a more rapid reduction in the oxygen concentration around the parts 17 to be welded.

In this embodiment, the shielding gas is composed of at least one of inert gas and reducing gas.

As used herein, the term "inert gas" refers to gases such as nitrogen gas, helium gas, argon gas, neon gas, and xenon gas, mixtures of two or more of these gases, and the like.

The shielding gas is preferably a gas containing 0.1 mass % or more reducing gas. Such a gas is more effective in suppressing the formation of oxides responsible for penetrators, thus further improving the toughness or strength of the weld. As used herein, the term "reducing gas" refers to gases such as hydrogen gas, carbon monoxide gas, methane gas, and propane gas, mixtures of two or more of these gases, and the like. The gas containing 0.1 mass % or more reducing gas is preferably reducing gas alone or a gas containing 0.1 mass % or more reducing gas and the balance being inert gas.

The following shielding gases are preferred for their availability and low cost:

(a) If inert gases are used alone, (G1) any one of nitrogen gas, helium gas, and argon gas or a mixture of two or more of these gases is preferred.

(b) If reducing gases are used alone, (G2) any one of hydrogen gas and carbon monoxide gas or a mixture of these gases is preferred.

(c) If mixtures of inert gases and reducing gases are used, a mixture of the gases (G1) and (G2) is preferred.

Note that careful safety measures are to be taken if gases containing hydrogen gas and/or carbon monoxide gas are used.

By controlling the shielding gas conditions as described above, the oxygen concentration around the parts to be welded can be greatly reduced to thus suppress penetrator formation.

(Amount of Upset)

Since penetrator formation is suppressed in the present disclosure as described above, an excessively high amount of upset is not necessary.

Accordingly, in this embodiment, the amount of upset is limited to not greater than the thickness t of the clad steel strip. This prevents the base metal in the weld from being exposed at the cladding metal-side surface of the steel pipe or tube. Although no lower limit is placed on the amount of upset, the amount of upset is preferably 20% or more of the thickness of the clad steel strip, in terms of reliably performing welding and also discharging slight penetrators generated. The amount of upset by the squeeze rolls is determined by measuring the outer perimeter of the pipe or tube situated in front of the squeeze rolls, then measuring the outer perimeter of the pipe or tube after welding the parts to be welded by the squeeze rolls and cutting the weld bead portion on the outer surface, and calculating the difference between these outer perimeters.

By controlling the combination of the conditions of the groove machining, the shielding gas, and the amount of upset as described above, the exposure of the base metal at the cladding metal-side surface can be completely prevented. Consequently, an electric-resistance-welded clad steel pipe or tube excellent in performance such as corrosion resistance can be obtained without performing post-treatment such as weld overlaying or melting and solidification as in the conventional techniques. Moreover, the region where solidification microstructure is formed can be reduced significantly, with it being possible to produce an electric resistance welded clad steel pipe or tube having no solidification microstructure at the positions (i) to (iii).

Although the foregoing embodiment describes an example of producing the clad steel pipe or tube so that the second layer 12 as the cladding metal is the inner layer and the first layer 11 as the base metal is the outer layer, the clad steel pipe or tube is not limited to such, and may have a structure in which the second layer as the cladding metal is the outer layer and the first layer as the base metal is the inner layer. In this case, too, the same advantageous effects can be achieved by forming a Y-groove through indentation from the second layer side, i.e. the cladding metal side.

[Post-Welding Heat Treatment]

In one of the disclosed embodiments, after the electric resistance welding, the electric resistance welded clad steel pipe or tube may be further heat treated and then cooled.

The heat treatment is performed under the following conditions:
  heating temperature at cladding metal-side surface of electric resistance welded clad steel pipe or tube: 750° C. to 1250° C.
  holding time at heating temperature at cladding metal-side surface of electric resistance welded clad steel pipe or tube: 10 sec or more
  heating temperature at base metal-side surface of electric resistance welded clad steel pipe or tube: 750° C. to 1200° C.
  holding time at heating temperature at base metal-side surface of electric resistance welded clad steel pipe or tube: 10 sec or more The cooling is performed under the following conditions:
  average cooling rate from 750° C. to 400° C. at cladding metal-side surface of electric resistance welded clad steel pipe or tube: 4° C./sec to 100° C./sec
  average cooling rate from 750° C. to 400° C. at base metal-side surface of electric resistance welded clad steel pipe or tube: 8° C./sec to 70° C./sec.

Conditions on Cladding Metal Side

If the heating temperature of the cladding metal is less than 750° C., the corrosion resistance decreases due to sensitization. If the heating temperature of the cladding metal is more than 1250° C., crystal grains coarsen, which facilitates sensitization in the subsequent cooling process. If the holding time is less than 10 sec, sensitization in the heating process is not resolved. If the average cooling rate from 750° C. to 400° C. is less than 4° C./sec, sensitization occurs in the cooling process, and the corrosion resistance decreases. If the average cooling rate is more than 100° C./sec, strain caused by rapid cooling increases stress corrosion crack sensitivity.

Conditions on Base Metal Side

If the heating temperature of the base metal is less than 750° C. or if the holding time is less than 10 sec, good weld microstructure is not obtained, and the workability and the toughness are insufficient. If the heating temperature of the base metal is more than 1200° C., crystal grains coarsen, and the toughness decreases. If the average cooling rate from 750° C. to 400° C. of the base metal is less than 8° C./sec, ferrite-pearlite formation causes insufficient strength. If the average cooling rate is more than 70° C./sec, martensite formation causes insufficient toughness.

By performing heat treatment and cooling under the conditions described above, the base metal microstructure in the vicinity of the weld can be formed as microstructure mainly composed of ferrite and bainite, and the average grain size of ferrite and bainite can be limited to 15 μm or less. This further improves the toughness of the weld.

Embodiment 2

An example in which an electric resistance welded clad steel pipe or tube is a three-layer clad steel pipe or tube will be described next. In Embodiment 2, the description of the same matters as those in Embodiment 1 is omitted as appropriate.

[Electric Resistance Welded Clad Steel Pipe or Tube]

An electric resistance welded clad steel pipe or tube 20 according to Embodiment 2 of the present disclosure will be described below, with reference to FIG. 10. The electric resistance welded clad steel pipe or tube 20 according to this embodiment is a three-layer electric resistance welded clad steel pipe or tube (hereafter also simply referred to as "clad steel pipe or tube") composed of a first layer 11 made of base metal, a second layer 12A placed on one surface of the first layer, and a third layer 12B placed on the other surface of the first layer.

In this embodiment, the same materials as those in Embodiment 1 can be used as the base metal and the cladding metal. The cladding metal forming the second layer and the cladding metal forming the third layer may be the same or different. In the following description, the cladding metal forming the second layer is also referred to as "first cladding metal", and the cladding metal forming the third layer as "second cladding metal".

In the electric resistance welded clad steel pipe or tube according to this embodiment, carbon steel or low-alloy steel having excellent mechanical properties and relatively inexpensive is used as the base metal, while stainless steel or a nickel-containing alloy having excellent corrosion resistance is used to form the inner surface and the outer surface. Such a clad steel pipe or tube has both the base metal-derived property such as strength and the cladding metal-derived corrosion resistance. Moreover, since both the inner surface and the outer surface are formed by material with high corrosion resistance, excellent corrosion resistance can be exhibited not only in the case where a high corrosive fluid flows inside the clad steel pipe or tube but also in the case where the clad steel pipe or tube is used in a corrosive atmosphere.

(Exposure of Base Metal)

Figure 15B:
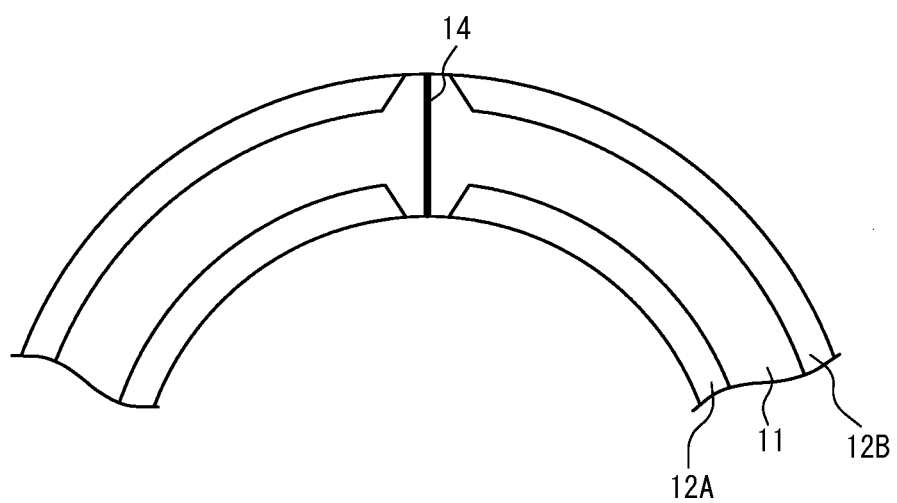
FIG. 15B is a schematic sectional diagram of an electric resistance weld and its vicinity in the case where a three-layer clad steel sheet is used as raw material and the amount of upset is large.

In the clad steel pipe or tube according to this embodiment, the base metal is not exposed at any of the inner surface and the outer surface in the weld. If the base metal is exposed at any of the surfaces of the steel pipe or tube as illustrated in FIG. 15B, the properties such as corrosion resistance in the exposed part decrease. This makes it impossible to achieve performance originally expected as a clad steel pipe or tube. In the present disclosure, the base metal is not exposed at the surface, so that the function as a clad steel pipe or tube is not impaired.

(Solidification Microstructure)

In the clad steel pipe or tube according to this embodiment as in the clad steel pipe or tube in Embodiment 1, no solidification microstructure is contained in each of circular sections of 0.1 mm in radius respectively centered at the following positions (i) to (iii) in a plane perpendicular to the pipe or tube longitudinal direction:

(i) a position that is 1 mm in depth from the outer surface of the electric resistance welded clad steel pipe or tube in the weld and is 0.3 mm in the transverse direction of the weld metal from the center of the width of the weld metal in the pipe or tube circumferential direction;

(ii) a position that is the center of the electric resistance welded clad steel pipe or tube in the thickness direction in the weld and is 0.3 mm in the transverse direction of the weld metal from the center of the width of the weld metal in the pipe or tube circumferential direction; and (iii) a position that is 1 mm in depth from the inner surface of the electric resistance welded clad steel pipe or tube in the weld and is 0.3 mm in the transverse direction of the weld metal from the center of the width of the weld metal in the pipe or tube circumferential direction.

Figure 10:
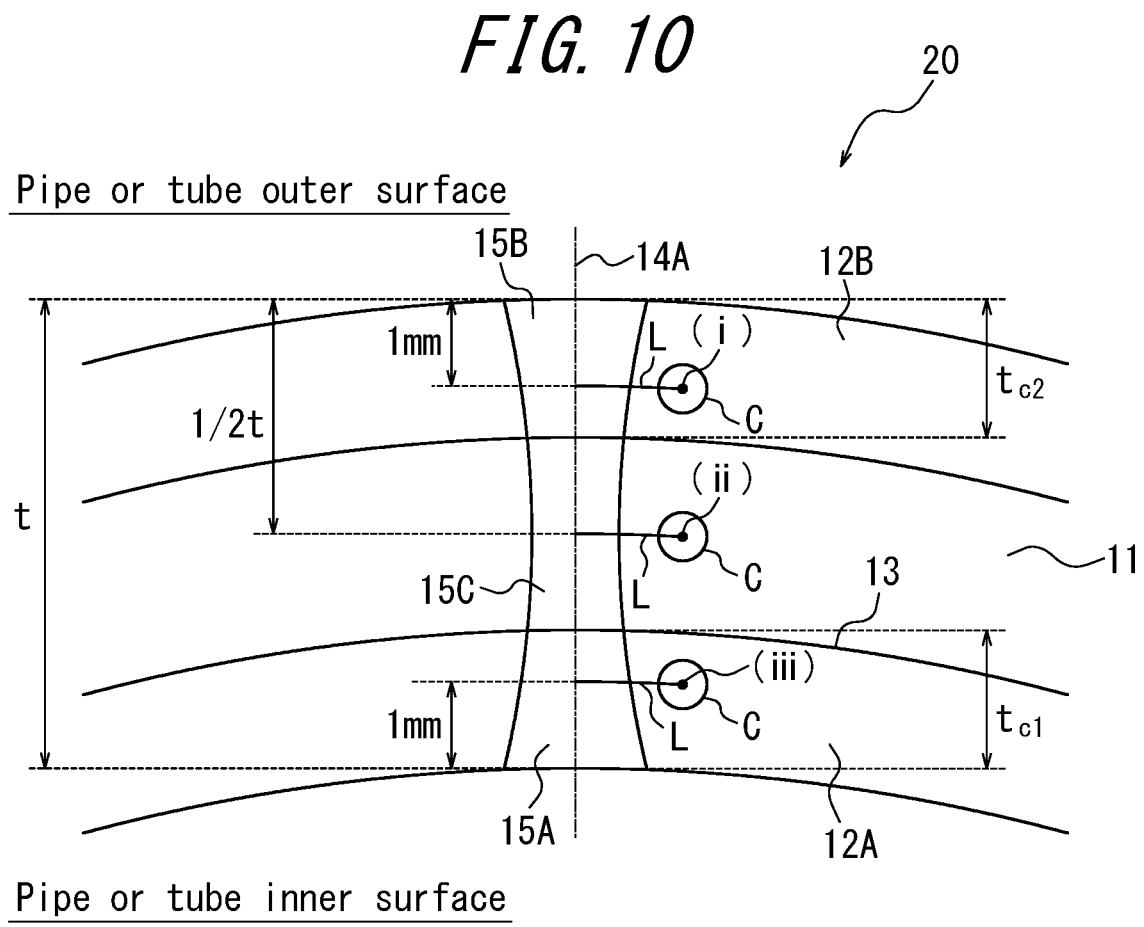
FIG. 10 is a sectional diagram of the vicinity of a weld of an electric resistance welded clad steel pipe or tube 20 according to Embodiment 2 of the present disclosure perpendicular to the pipe or tube longitudinal direction.

FIG. 10 illustrates the positions corresponding to (i) to (iii). Weld metal 15A and weld metal 15B formed by electric resistance welding are present in the weld of the electric resistance welded clad steel pipe or tube 20. (i) to (iii) respectively correspond to a position of 1 mm in depth from the outer surface of the clad steel pipe or tube, a position of center (½t) in the thickness direction of the clad steel pipe or tube, and a position of 1 mm in depth from the inner surface of the clad steel pipe or tube in the weld. These positions (i) to (iii) are 0.3 mm away in the transverse direction of the weld metal from the center 14A of the pipe or tube circumferential width of the weld metal at the respective depth positions, as indicated by L. Note that FIG. 10 is a schematic diagram for describing the presently disclosed techniques, and is not based on the actual dimensional ratios.

In the present disclosure, no solidification microstructure is contained in each of the circular sections C of 0.1 mm in radius centered at the respective positions (i) to (iii) in a plane perpendicular to the pipe or tube longitudinal direction. Such absence of solidification microstructure in a position near the transverse center 14A of the weld metal, i.e. a position of 0.3 mm from the transverse center 14A of the weld metal, indicates that the width of the site degraded in properties due to welding is limited to a very narrow width. A clad steel pipe or tube satisfying these conditions has excellent mechanical properties such as toughness.

Although the positions (i) to (iii) are illustrated only on one side (right in the drawing) of the weld metal in a section perpendicular to the pipe or tube longitudinal direction in FIG. 10, actually the corresponding positions are also on the opposite side (left in the drawing) of the weld metal. In the present disclosure, the foregoing conditions need to be satisfied on at least one side, and are preferably satisfied on both sides. Under typical welding conditions, the influence of welding is bilaterally symmetric. Hence, if the conditions according to the present disclosure are satisfied on one side of the weld metal, then it can be assumed that the same conditions are satisfied on the opposite side.

In this embodiment, the weld metal identification and the determination of whether or not solidification microstructure is included can be performed by the same methods as in Embodiment 1.

In the present disclosure, it is preferable that the metallic microstructure at the position (ii) is metallic microstructure in which the total area ratio of ferrite and bainite is 90% or more and the average grain size of ferrite and bainite is 15 µm or less. This condition defines the metallic microstructure at the position (ii) which is the sheet thickness center position.

Total Area Ratio of Ferrite and Bainite: 90% or More

As a result of the metallic microstructure at the above-mentioned position being mainly composed of ferrite and bainite, a steel pipe or tube excellent in strength, toughness, and ductility even in a weld can be obtained. No upper limit is placed on the total area ratio, and the upper limit may be 100%.

Average Grain Size of Ferrite and Bainite: 15 µm or Less

As a result of the average grain size of ferrite and bainite being 15 µm or less, a steel pipe or tube having excellent strength and toughness in a weld can be obtained. The average grain size is more preferably 12 µm or less. No lower limit is placed on the average grain size, yet the average grain size is 0.5 µm or more in industrial terms.

[Production Method]

The above-described clad steel pipe or tube according to Embodiment 2 of the present disclosure can be produced by electric resistance welding under specific conditions described below.

In Embodiment 2, the electric resistance welded clad steel pipe or tube can be produced using the line illustrated in FIG. 2, as in Embodiment 1. The production process in this case may be the same as that in Embodiment 1.

Figure 11A:
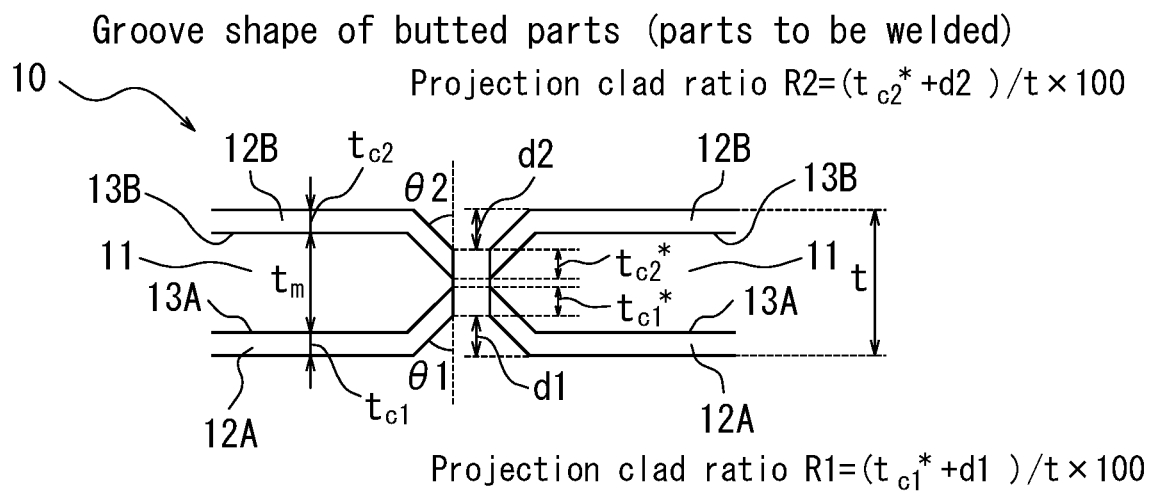
FIG. 11A is a sectional diagram illustrating a groove shape of both transverse ends (butted parts) of a clad steel strip in Embodiment 2 of the present disclosure.
Figure 11B:
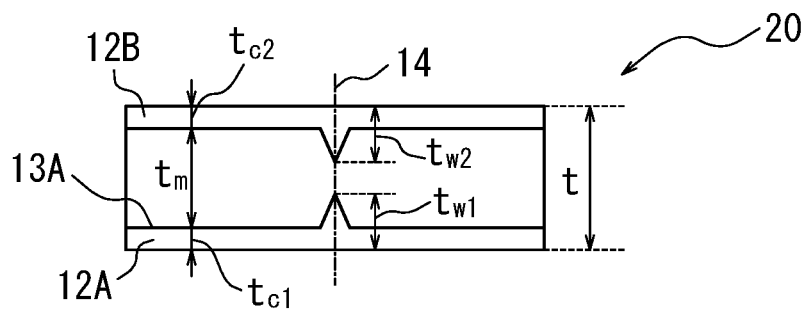
FIG. 11B is a sectional diagram illustrating the weld and its vicinity after electric resistance welding the clad steel strip.

This embodiment describes an example in which electric resistance welding is performed using the clad steel strip 10 composed of the first layer 11 made of the base metal, the second layer 12A pressure-bonded to the first layer, and the third layer 12B pressure-bonded to the first layer so that the second layer 12A is the inner side and the third layer 12B is the outer side, as illustrated in FIG. 11A.

(Groove Machining)

In this embodiment, both transverse ends of the clad steel strip are subjected to groove machining to form a groove. This groove machining will be described below, with reference to FIG. 11A.

In the groove machining, both transverse ends of the clad steel strip 10 are indented from the second layer 12A side and the third layer 12B side. The groove formed is an X-groove as illustrated in FIG. 11A, and satisfies the same conditions (i) to (iv) as in Embodiment 1 and further satisfies the following conditions (v) to (viii):

(i) A clad interface 13A which is the interface between the second layer 12A and the first layer 11 turns from the second layer side toward the thickness center of the clad steel strip.

(ii) The bevel angle θ1 on the second layer side is 10° or more and 50° or less.

(iii) The groove depth d1 is 10% or more and 45% or less of the thickness t of the clad steel strip.

(iv) The projection clad ratio R1 defined by the following Expression (1) is 25% or more and 50% or less:

$$R1=(t_{c1}{}^{*}+d1)/t\times100(\%) \qquad (1)$$

where R1 is the projection clad ratio (second layer side), $t_{c1}{}^{*}$ is the thickness (mm) of the second layer at the root surface, d1 is the groove depth (mm) on the second layer side, and t is the thickness (mm) of the clad steel strip.

(v) A clad interface 13B between the third layer 12B and the first layer 11 turns from the third layer side toward the thickness center of the clad steel strip.

(vi) The bevel angle θ2 on the third layer side is 10° or more and 50° or less.

(vii) The groove depth d2 is 10% or more and 45% or less of the thickness t of the clad steel strip.

(viii) The projection clad ratio R2 defined by the following Expression (2) is 25% or more and 50% or less:

$$R2=(t_{c2}{*}+d2)/t\times 100(\%) \qquad (2)$$

where R2 is the projection clad ratio (third layer side), $t_{c2}{*}$ is the thickness (mm) of the third layer at the root surface, d2 is the groove depth (mm) on the third layer side, and t is the thickness (mm) of the clad steel strip.

It is important that the X-groove is formed by indenting the transverse ends of the clad steel strip 10 from the second layer 12A side and the third layer 12B side, and not by cutting off the second layer-side corners and the third layer-side corners of the transverse ends of the clad steel strip 10. As a result, the clad interface 13A is indented from the second layer side toward the thickness center of the clad steel strip, and the clad interface 13B is indented from the third layer side toward the thickness center of the clad steel strip. In addition, the bevel angles θ1 and θ2, the groove depths d1 and d2, and the projection clad ratios R1 and R2 are set to the foregoing ranges. Thus, the entry of the molten steel and the heat-affected zone of the base metal into the welded seam part of the first cladding metal or the second cladding metal after electric resistance welding can be suppressed. Consequently, the base metal is kept from being exposed at the inner or outer surface of the steel pipe or tube in the weld. This makes it possible to obtain an electric-resistance-welded clad steel pipe or tube whose inner and outer surfaces are entirely, including the weld, covered with the cladding metal, after cutting the inner surface bead of the weld.

Moreover, since the groove shape has no corners at which current concentrates, the temperature distribution of the whole parts to be welded is uniform. This facilitates discharging of penetrators from the weld, and as a result prevents a decrease in the toughness and strength of the weld.

If the bevel angle θ1 or θ2 is less than 10°, the uniformity of the temperature distribution of the whole parts to be welded cannot be maintained, as a result of which discharging of penetrators tends to be insufficient. This causes insufficient properties such as toughness and strength of the weld.

If the bevel angle θ1 or θ2 is more than 50°, the effect of suppressing the entry of the molten steel and the heat-affected zone of the base metal into the welded seam part of the cladding metal is insufficient. Consequently, the base metal is more likely to be exposed at the inner surface or the outer surface of the steel pipe or tube in the weld.

If the groove depth d1 or d2 is less than 10% of the thickness t of the clad steel strip, the effect of suppressing the entry of the molten steel and the heat-affected zone of the base metal into the welded seam part of the cladding metal is insufficient. Consequently, the base metal is more likely to be exposed at the inner surface or the outer surface of the steel pipe or tube in the weld.

If the groove depth d1 or d2 is more than 45% of the thickness t of the clad steel strip, the composition of the weld is a high-alloy composition similar to the composition of the cladding metal. This causes insufficient properties such as toughness and strength of the weld.

In terms of achieving both the prevention of the exposure of the base metal at the steel pipe or tube surface and the prevention of a decrease in the properties of the weld at higher level, the bevel angle θ1 is preferably 15° or more, the bevel angle θ1 is preferably 35° or less, the bevel angle θ2 is preferably 15° or more, the bevel angle θ2 is preferably 35° or less, the groove depth d1 is preferably 15% or more of the thickness t of the clad steel strip, the groove depth d1 is preferably 35% or less of the thickness t of the clad steel strip, the groove depth d2 is preferably 15% or more of the thickness t of the clad steel strip, and the groove depth d2 is preferably 35% or less of the thickness t of the clad steel strip.

It is also very important in this embodiment that the projection clad ratio R1 defined by Expression (1) and the projection clad ratio R2 defined by Expression (2) are 25% or more and 50% or less. If at least one of the projection clad ratios R1 and R2 is less than 25%, the effect of suppressing the entry of the molten steel and the heat-affected zone of the base metal into the welded seam part of the cladding metal is insufficient. Consequently, the base metal is exposed at the surface of the steel pipe or tube in the weld. In the three-layer clad steel pipe or tube as in this embodiment, the physical upper limit of the projection clad ratios R1 and R2 is 50%.

With the groove shape satisfying all of these conditions, the molten base metal can be prevented from being exposed at the cladding metal-side surface, and the mechanical properties of the weld can be improved.

Figure 12:
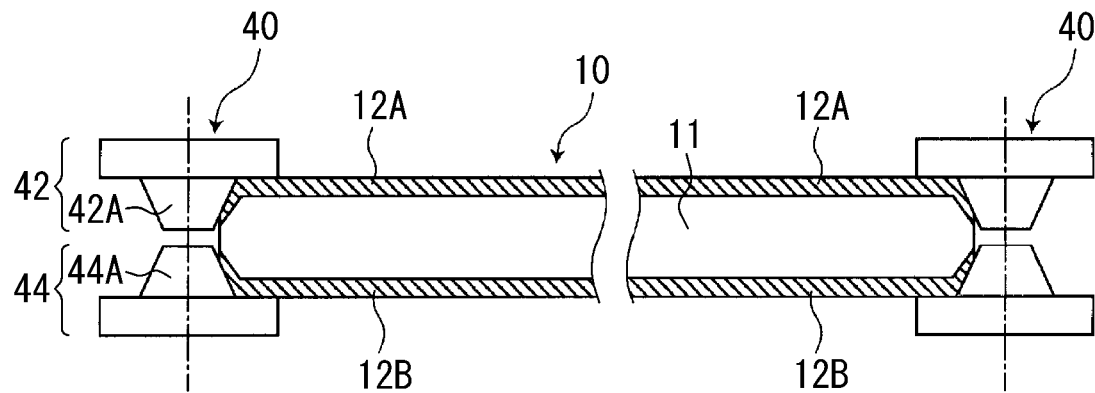
FIG. 12 is a schematic diagram illustrating a groove machine usable in Embodiment 2 of the present disclosure.

The groove machining in this embodiment can be performed using, for example, a groove machine 40 illustrated in FIG. 12. The groove machine 40 is a rolling-type groove machine capable of continuously machining the running clad steel strip 10, and includes a pair of right and left upper side rolls 42 and a pair of right and left lower side rolls 44. As a result of the upper side rolls 42 having a rolling portion 42A that increases in diameter upward in reverse taper shape and the lower side rolls 44 having a rolling portion 44A that increases in diameter downward in reverse taper shape as illustrated in FIG. 12, the X-groove can be formed at both transverse ends of the clad steel strip 10.

By changing the reverse taper shape of each of the rolling portions 42A and 44A, the groove shape of the transverse ends of the clad steel strip can be adjusted as desired. As illustrated in FIG. 11A, the projection clad ratio R1 depends on the ratio of the thickness $t_m$ of the first layer (base metal) and the thickness $t_{c1}$ of the second layer in the clad steel strip 10 and the groove shape by the indentation, and the projection clad ratio R2 depends on the ratio of the thickness $t_m$ of the first layer (base metal) and the thickness $t_{c2}$ of the third layer in the clad steel strip 10 and the groove shape by the indentation. Accordingly, each of the projection clad ratios R1 and R2 can be set to a desired value by selecting the ratio appropriately and also adjusting the reverse taper shape of the rolling portion 42A or 44A to form an appropriate groove shape.

(Gas Shielding)

Figure 13A:
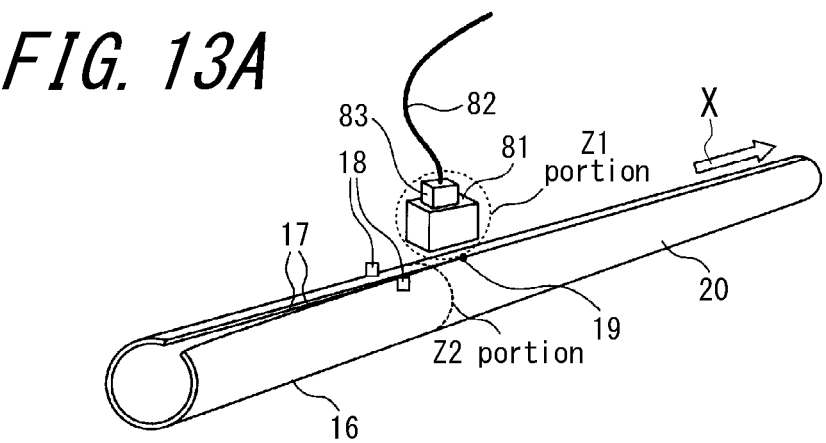
FIG. 13A is a schematic diagram for explaining gas shielding in Embodiment 2 of the present disclosure, and is a perspective diagram of an open pipe or tube 16 and the electric resistance welded clad steel pipe or tube 20 which are being transferred.
Figure 13B:
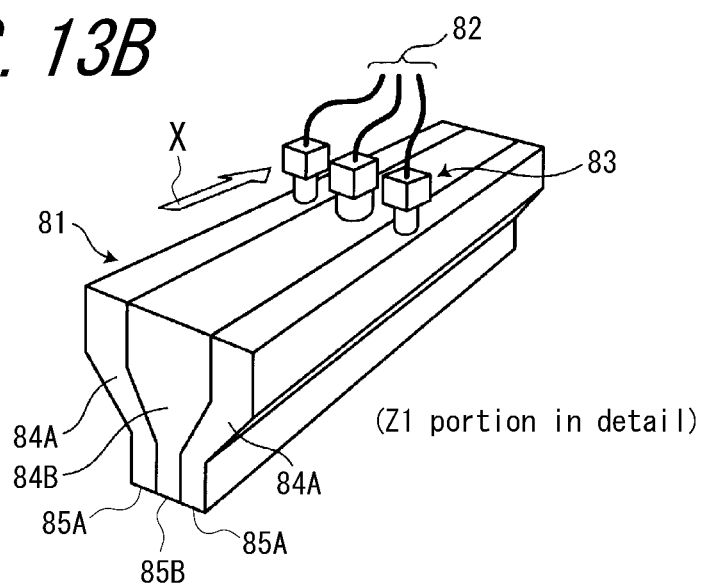
FIG. 13B is a schematic diagram for explaining gas shielding, and is an enlarged perspective diagram of a shielding-gas blowing nozzle 81 in a Z1 portion in FIG. 13A.
Figure 13C:
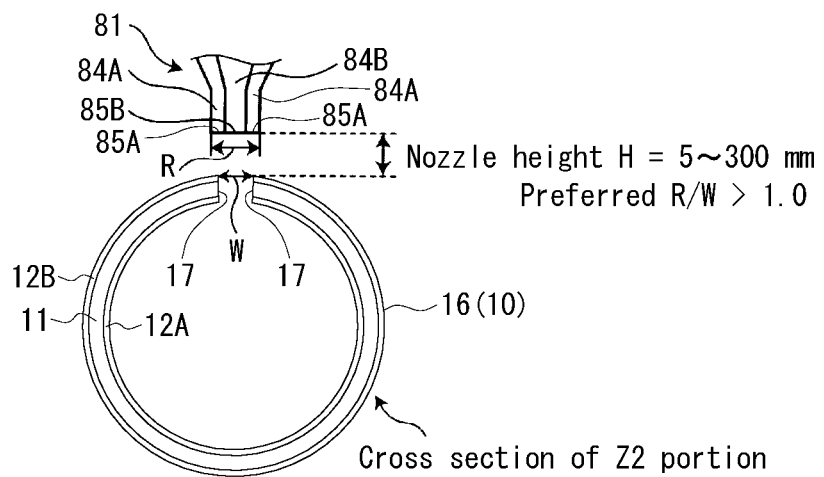
FIG. 13C is a schematic diagram for explaining gas shielding, and is a sectional diagram of a Z2 portion in FIG. 13A.

Next, as illustrated in FIGS. 13A and 13C, the clad steel strip 10 is formed into a pipe or tube shape, to obtain an open pipe or tube 16 that is a cylindrical strip before welding. A pair of butted parts (parts to be welded) 17 of the open pipe or tube facing each other are, while being subjected to gas shielding, butt pressed and electric resistance welded, to obtain the clad steel pipe or tube 20.

The gas shielding can be performed by the same method as in Embodiment 1 (see FIGS. 13A to 14). The shielding gas conditions may be the same conditions as in Embodiment 1. In the three-layer clad steel pipe or tube, too, the relationship between the oxygen concentration around the parts to be welded and the flatness value h/D of the clad steel pipe or tube in a 90° flattening test had tendency similar to that in Embodiment 1 (FIG. 9).

(Amount of Upset)

Since penetrator formation is suppressed in the present disclosure as described above, an excessively high amount of upset is not necessary. Accordingly, in this embodiment, the amount of upset is limited to not greater than the thickness t of the clad steel strip. This prevents the base metal in the weld from being exposed at the surface of the steel pipe or tube. Although no lower limit is placed on the amount of upset, the amount of upset is preferably 20% or more of the thickness of the clad steel strip, in terms of reliably performing welding and also discharging slight penetrators generated. The amount of upset by the squeeze rolls is determined by measuring the outer perimeter of the pipe or tube situated in front of the squeeze rolls, then measuring the outer perimeter of the pipe or tube after welding the parts to be welded by the squeeze rolls and cutting the weld bead portion on the outer surface, and calculating the difference between these outer perimeters.

By controlling the combination of the conditions of the groove machining, the shielding gas, and the amount of upset as described above, the exposure of the base metal at the cladding metal-side surface can be completely prevented. Consequently, an electric-resistance-welded clad steel pipe or tube excellent in performance such as corrosion resistance can be obtained without performing post-treatment such as weld overlaying or melting and solidification as in the conventional techniques. Moreover, the region where solidification microstructure is formed can be reduced significantly, with it being possible to produce an electric resistance welded clad steel pipe or tube having no solidification microstructure at the positions (i) to (iii).

[Post-Welding Heat Treatment]

In one of the disclosed embodiments, after the electric resistance welding, the electric resistance welded clad steel pipe or tube may be further heat treated and then cooled.

The heat treatment is performed under the following conditions:

heating temperature at inner and outer surfaces of electric resistance welded clad steel pipe or tube: 750° C. to 1250° C.

holding time at heating temperature at inner and outer surfaces of electric resistance welded clad steel pipe or tube: 10 sec or more heating temperature at wall thickness center position of electric resistance welded clad steel pipe or tube: 750° C. to 1200° C.

holding time at heating temperature at wall thickness center position of electric resistance welded clad steel pipe or tube: 10 sec or more.

The cooling is performed under the following conditions:

average cooling rate from 750° C. to 400° C. at inner and outer surfaces of electric resistance welded clad steel pipe or tube: 4° C./sec to 100° C./sec average cooling rate from 750° C. to 400° C. at wall thickness center position of electric resistance welded clad steel pipe or tube: 8° C./sec to 70° C./sec.

Conditions at Inner and Outer Surfaces

If the heating temperature at the inner and outer surfaces of the steel pipe or tube, i.e. at the surface of the cladding metal, is less than 750° C., the corrosion resistance decreases due to sensitization. If the heating temperature is more than 1250° C., crystal grains coarsen, which facilitates sensitization in the subsequent cooling process. If the holding time is less than 10 sec, sensitization in the heating process is not resolved. If the average cooling rate from 750° C. to 400° C. is less than 4° C./sec, sensitization occurs in the cooling process, and the corrosion resistance decreases. If the average cooling rate is more than 100° C./sec, strain caused by rapid cooling increases stress corrosion crack sensitivity.

Conditions at Wall Thickness Center Position

The base metal is present at the wall thickness center position of the steel pipe or tube. If the heating temperature at this position is less than 750° C. or if the holding time is less than 10 sec, good weld microstructure is not obtained, and the workability and the toughness are insufficient. If the heating temperature at the wall thickness center position is more than 1200° C., crystal grains coarsen, and the toughness decreases. If the average cooling rate from 750° C. to 400° C. at the wall thickness center position is less than 8° C./sec, ferrite-pearlite formation causes insufficient strength. If the average cooling rate is more than 70° C./sec, martensite formation causes insufficient toughness.

By performing heat treatment and cooling under the conditions described above, the base metal microstructure in the vicinity of the weld can be formed as microstructure mainly composed of ferrite and bainite, and the average grain size of ferrite and bainite can be limited to 15 μm or less. This further improves the toughness of the weld.

EXAMPLES

Example 1

Electric-resistance-welded two-layer clad steel pipes or tubes were produced by the following procedure. First, each two-layer clad hot-rolled steel strip composed of a first layer made of cladding metal having the chemical composition shown in Table 1 and a second layer made of base metal having the chemical composition shown in Table 2 was produced. The respective thicknesses of the first layer and the second layer are shown in Table 3.

Next, a clad steel pipe or tube of 400 mm in outer diameter was produced under various conditions by the electric-resistance-welded steel pipe or tube production line illustrated in FIG. 2, using the prepared clad steel strip as raw material with the base metal being on the pipe or tube outer surface side and the cladding metal being on the pipe or tube inner surface side. Here, both transverse ends of the clad steel strip were subjected to groove machining by the rolling-type groove machine 40, to form a Y-groove of the shape shown in Table 1 at the transverse ends.

The amount of upset in the electric resistance welding is shown in Table 1. During the electric resistance welding, the parts to be welded were shielded with shielding gas using the nozzle illustrated in FIGS. 5A to 5C under the conditions of nozzle height H, gas release flow rate B, and flow rate ratio B/A shown in Table 1. The shielding gas was nitrogen.

After this, post-welding heat treatment was performed under the conditions shown in Table 3.

For each obtained electric-resistance-welded clad steel pipe or tube, whether or not solidification microstructure was present, whether or not the base metal was exposed, the total area ratio of ferrite and bainite, and the average grain size of ferrite and bainite were evaluated by the following methods. The obtained results are shown in Table 4. In the measurements described below, the measurement results of whether or not solidification microstructure was present, the area ratio, and the average grain size were the same on the right and left sides of the weld metal in a section perpendicular to the pipe or tube longitudinal direction.

(Solidification Microstructure)

Whether or not solidification microstructure was present at each of the positions (i) to (iii) was determined based on an image of a predetermined region taken using an optical microscope at 400 magnifications.

(Exposure of Base Metal)

A section perpendicular to the pipe or tube longitudinal direction of the obtained electric-resistance-welded clad steel pipe or tube was etched with a nital solution. In the case where the cladding metal-side surface was continuously covered by a region not etched at all (i.e. the cladding metal), it was determined that the base metal was not exposed. Otherwise, i.e. in the case where an etched region was observed at the cladding metal-side surface, it was determined that the base metal was exposed.

(Area Ratio)

Each test piece was polished, and etched with a nital solution to reveal microstructure. An image of metallic microstructure at 400 magnifications was obtained using an optical microscope. The total area ratio of ferrite and bainite was calculated using an image analyzer.

(Average Grain Size)

Test pieces were collected from each obtained electric resistance welded clad steel pipe or tube so that each of the positions (i) to (iii) was an observation position. The crystal grain boundaries at the test piece surface were revealed by etching with a nital solution, and an image of metallic microstructure was obtained using an optical microscope. The grain size was measured from the image by the cutting method described in ASTM E112, and the nominal grain size was taken to be the average grain size.

Furthermore, the following tests were performed to evaluate the toughness in the weld and the corrosion resistance of the cladding metal of the obtained electric resistance welded clad steel pipe or tube. The obtained results are shown in Table 4.

(Toughness)

A V-notch test piece was collected so that the longitudinal direction of the test piece was the circumferential direction of the steel pipe or tube, the notch position was the weld, and the notch direction was the longitudinal direction of the steel pipe or tube, and a Charpy impact test in accordance with ASTM A370 was performed to determine the fracture appearance transition temperature vTrs (° C.). The toughness of the weld was evaluated using the obtained value of vTrs, based on the following criteria.

Excellent: vTrs: −45° C. or less
Good: vTrs: more than −45° C. and −30° C. or less
Poor: vTrs: more than −30° C.

(Corrosion Resistance of Cladding Metal)

In addition, the corrosion resistance of the cladding metal was evaluated by a sulfuric acid-copper sulfate corrosion test in accordance with ASTM A262-13, Practice E, with reference to API specification 5LD, $4^{th}$ Edition. To evaluate the corrosion resistance of the cladding metal, the base metal side was removed by grinding while leaving the cladding metal side, to obtain a test piece made only of the cladding metal. In the evaluation of the corrosion resistance, the test piece after the test was observed visually or observed at 10 magnifications using a stereoscopic microscope or the like as appropriate, and each test piece observed to have no crack was determined as "good" and each test piece observed to have any crack was determined as "poor". Further, the corrosion resistance of each test piece determined as "good" was also evaluated by a ferric chloride test described in ASTM G48-A. Each test piece whose corrosion loss in a 72 hr corrosion test was less than 0.5 $g/m^2$ was determined as "excellent".

TABLE 1

| Cladding metal | Chemical composition (mass %) * | | | | | | | | | | | | | |
|---|---|---|---|---|---|---|---|---|---|---|---|---|---|---|
| ID | C | Si | Mn | P | S | Ni | Cr | Al | N | Mo | Cu | Ti | Nb | Category |
| C1 | 0.04 | 0.20 | 0.60 | 0.025 | 0.001 | 0.20 | 16.1 | 0.01 | 0.04 | — | — | — | — | Stainless steel |
| C2 | 0.06 | 0.33 | 0.99 | 0.040 | 0.007 | 8.21 | 18.5 | 0.01 | 0.05 | — | — | — | — | Stainless steel |
| C3 | 0.02 | 0.13 | 0.03 | 0.004 | 0.001 | 61.60 | 21.3 | 0.12 | 0.05 | 8.6 | — | 0.25 | 3.31 | Nickel-containing alloy |
| C4 | 0.01 | 0.20 | 0.40 | 0.017 | 0.002 | 38.90 | 22.5 | 0.1 | 0.05 | 3.1 | 2.2 | 0.7 | — | Nickel-containing alloy |
| C5 | 0.02 | 0.76 | 1.06 | 0.032 | 0.002 | 12.18 | 17.44 | 0.01 | 0.03 | 2.3 | 0.24 | — | — | Stainless steel |
| C6 | 0.01 | 0.16 | 0.11 | 0.024 | 0.004 | 0.21 | 29.71 | 0.15 | 0.01 | 2.0 | 0.02 | — | 0.15 | Stainless steel |

* the balance being Fe and inevitable impurities

TABLE 2

| Base metal | Chemical composition (mass %) * | | | | | | | | | | | | |
|---|---|---|---|---|---|---|---|---|---|---|---|---|---|
| ID | C | Si | Mn | P | S | Al | Ca | Cr | Mo | Cu | Ti | Nb | Category |
| B1 | 0.04 | 0.19 | 1.6 | 0.006 | 0.003 | 0.04 | 0.0012 | — | — | — | 0.01 | 0.05 | Low-carbon steel |
| B2 | 0.05 | 0.25 | 1.5 | 0.013 | 0.003 | 0.03 | — | 0.3 | 0.4 | — | 0.01 | — | Low-alloy steel |

* the balance being Fe and inevitable impurities

TABLE 3

| | Cladding metal | | Base metal | | Whole thickness | Material of inner surface | Groove machining conditions | | | Cladding metal thickness | Projection clad ratio | Amount |
| | | | | | | | Bevel | Groove depth | | tc1* at root | | of |
| No. | Cladding metal ID | Thickness $t_{c1}$ (mm) | Base metal ID | Thickness tm (mm) | t (mm) | of steel pipe or tube | angle θ1 (°) | d1 (mm) | d1/t (%) | surface (mm) | R1 (%) | upset (mm) |
|---|---|---|---|---|---|---|---|---|---|---|---|---|
| 1 | C1 | 4.0 | B1 | 16.0 | 20.0 | Cladding metal | 20 | 5.0 | 25 | 4.1 | 45.5 | 10 |
| 2 | C1 | 4.0 | B1 | 16.0 | 20.0 | Cladding metal | 40 | 5.0 | 25 | 3.7 | 43.5 | 10 |
| 3 | C1 | 4.0 | B1 | 16.0 | 20.0 | Cladding metal | 30 | 3.0 | 15 | 4.2 | 36.0 | 10 |
| 4 | C1 | 4.0 | B1 | 16.0 | 20.0 | Cladding metal | 20 | 5.0 | 25 | 4.1 | 45.5 | 18 |
| 5 | C1 | 4.0 | B1 | 16.0 | 20.0 | Cladding metal | 20 | 5.0 | 25 | 4.1 | 45.5 | 10 |
| 6 | C1 | 4.0 | B1 | 16.0 | 20.0 | Cladding metal | 20 | 5.0 | 25 | 4.1 | 45.5 | 10 |
| 7 | C1 | 4.0 | B1 | 16.0 | 20.0 | Cladding metal | <u>8</u> | 5.0 | 25 | 4.3 | 46.5 | 10 |
| 8 | C1 | 4.0 | B1 | 16.0 | 20.0 | Cladding metal | <u>60</u> | 5.0 | 25 | 3.5 | 42.5 | 10 |
| 9 | C1 | 4.0 | B1 | 16.0 | 20.0 | Cladding metal | 20 | 10 | <u>50</u> | 3.5 | <u>67.5</u> | 10 |
| 10 | C1 | 4.0 | B1 | 16.0 | 20.0 | Cladding metal | 20 | 1.0 | <u>5</u> | 3.2 | <u>21.0</u> | 10 |
| 11 | C1 | 4.0 | B1 | 16.0 | 20.0 | Cladding metal | 20 | 5.0 | 25 | 4.1 | 45.5 | <u>25</u> |
| 12 | C1 | 4.0 | B1 | 16.0 | 20.0 | Cladding metal | 20 | 5.0 | 25 | 4.1 | 45.5 | 10 |
| 13 | C1 | 4.0 | B1 | 16.0 | 20.0 | Cladding metal | 20 | 5.0 | 25 | 4.1 | 45.5 | 10 |
| 14 | C1 | 4.0 | B1 | 16.0 | 20.0 | Cladding metal | 20 | 5.0 | 25 | 4.1 | 45.5 | 10 |
| 15 | C1 | 4.0 | B1 | 16.0 | 20.0 | Cladding metal | 20 | 5.0 | 25 | 4.1 | 45.5 | 10 |
| 16 | C1 | 4.0 | B1 | 16.0 | 20.0 | Cladding metal | 20 | 5.0 | 25 | 4.1 | 45.5 | 10 |
| 17 | C1 | 4.0 | B1 | 16.0 | 20.0 | Cladding metal | 20 | 5.0 | 25 | 4.1 | 45.5 | 10 |
| 18 | C1 | 4.0 | B1 | 16.0 | 20.0 | Cladding metal | 20 | 5.0 | 25 | 4.1 | 45.5 | 10 |
| 19 | C1 | 4.0 | B1 | 16.0 | 20.0 | Cladding metal | 20 | 5.0 | 25 | 4.1 | 45.5 | 10 |
| 20 | C1 | 4.0 | B1 | 16.0 | 20.0 | Cladding metal | 20 | 5.0 | 25 | 4.1 | 45.5 | 10 |
| 21 | C1 | 4.0 | B1 | 16.0 | 20.0 | Cladding metal | 20 | 5.0 | 25 | 4.1 | 45.5 | 10 |
| 22 | C1 | 4.0 | B1 | 16.0 | 20.0 | Cladding metal | 20 | 5.0 | 25 | 4.1 | 45.5 | 10 |
| 23 | C1 | 4.0 | B1 | 16.0 | 20.0 | Cladding metal | 20 | 5.0 | 25 | 4.1 | 45.5 | 10 |
| 24 | C1 | 4.0 | B1 | 16.0 | 20.0 | Cladding metal | 20 | 5.0 | 25 | 4.1 | 45.5 | 10 |
| 25 | C2 | 4.0 | B1 | 16.0 | 20.0 | Cladding metal | 20 | 5.0 | 25 | 4.1 | 45.5 | 10 |
| 26 | C2 | 4.0 | B2 | 16.0 | 20.0 | Cladding metal | 20 | 5.0 | 25 | 4.1 | 45.5 | 10 |
| 27 | C3 | 4.0 | B1 | 16.0 | 20.0 | Cladding metal | 20 | 5.0 | 25 | 4.1 | 45.5 | 10 |
| 28 | C4 | 4.0 | B1 | 16.0 | 20.0 | Cladding metal | 20 | 5.0 | 25 | 4.1 | 45.5 | 10 |
| 29 | C5 | 4.0 | B1 | 16.0 | 20.0 | Cladding metal | 20 | 5.0 | 25 | 4.1 | 45.5 | 10 |
| 30 | C6 | 4.0 | B1 | 16.0 | 20.0 | Cladding metal | 20 | 5.0 | 25 | 4.1 | 45.5 | 10 |
| 31 | C1 | 4.0 | B1 | 16.0 | 20.0 | Cladding metal | 20 | 5.0 | 25 | 4.1 | 45.5 | 10 |

TABLE 3-continued

| | Gas shielding conditions | | | Post-welding heat treatment conditions | | | | | | |
|---|---|---|---|---|---|---|---|---|---|---|
| | | Gas release | Gas Flow | Cladding metal-side surface | | | Base metal-side surface | | | |
| | Nozzle height H | flow rate B | rate ratio | Heating temperature | Holding time | Cooling rate | Heating temperature | Holding time | Cooling rate | |
| No. | (mm) | (m/s) | B/A | (° C.) | (s) | (° C./sec) | (° C.) | (s) | (° C./sec) | Remarks |
| 1 | 100 | 10 | 0.5 | 1000 | 10 | 20 | 1000 | 10 | 20 | Example |
| 2 | 100 | 10 | 0.5 | 1000 | 10 | 20 | 1000 | 10 | 20 | Example |
| 3 | 100 | 10 | 0.5 | 1000 | 10 | 20 | 1000 | 10 | 20 | Example |
| 4 | 100 | 10 | 0.05 | 1000 | 10 | 20 | 1000 | 10 | 20 | Example |
| 5 | 8 | 10 | 0.5 | 1000 | 10 | 20 | 1000 | 10 | 20 | Example |
| 6 | 280 | 10 | 5 | 1000 | 10 | 20 | 1000 | 10 | 20 | Example |
| 7 | 100 | 10 | 0.5 | 1000 | 10 | 20 | 1000 | 10 | 20 | Comparative Example |
| 8 | 100 | 10 | 0.5 | 1000 | 10 | 20 | 1000 | 10 | 20 | Comparative Example |
| 9 | 100 | 10 | 0.5 | 1000 | 10 | 20 | 1000 | 10 | 20 | Comparative Example |
| 10 | 100 | 10 | 0.5 | 1000 | 10 | 20 | 1000 | 10 | 20 | Comparative Example |
| 11 | 100 | 10 | 0.5 | 1000 | 10 | 20 | 1000 | 10 | 20 | Comparative Example |
| 12 | 3 | 10 | 0.5 | 1000 | 10 | 20 | 1000 | 10 | 20 | Comparative Example |
| 13 | 350 | 10 | 0.5 | 1000 | 10 | 20 | 1000 | 10 | 20 | Comparative Example |
| 14 | 100 | 0.2 | 0.5 | 1000 | 10 | 20 | 1000 | 10 | 20 | Comparative Example |
| 15 | 100 | 60 | 0.5 | 1000 | 10 | 20 | 1000 | 10 | 20 | Comparative Example |
| 16 | 100 | 10 | 12 | 1000 | 10 | 20 | 1000 | 10 | 20 | Comparative Example |
| 17 | 100 | 10 | 0.5 | 900 | 10 | 20 | 700 | 10 | 20 | Example |
| 18 | 100 | 10 | 0.5 | 700 | 10 | 20 | 900 | 10 | 20 | Example |
| 19 | 100 | 10 | 0.5 | 1000 | 10 | 10 | 1000 | 10 | 5 | Example |
| 20 | 100 | 10 | 0.5 | 1000 | 10 | 2 | 1000 | 10 | 10 | Example |
| 21 | 100 | 10 | 0.5 | 1000 | 10 | 110 | 1000 | 10 | 50 | Example |
| 22 | 100 | 10 | 0.5 | 1000 | 10 | 50 | 1000 | 10 | 120 | Example |
| 23 | 100 | 10 | 0.5 | 1300 | 10 | 20 | 1000 | 10 | 20 | Example |
| 24 | 100 | 10 | 0.5 | 1000 | 10 | 20 | 1250 | 10 | 20 | Example |
| 25 | 100 | 10 | 0.5 | 1000 | 10 | 20 | 1000 | 10 | 20 | Example |
| 26 | 100 | 10 | 0.5 | 1000 | 10 | 20 | 1000 | 10 | 20 | Example |
| 27 | 100 | 10 | 0.5 | 1000 | 10 | 20 | 1000 | 10 | 20 | Example |
| 28 | 100 | 10 | 0.5 | 1000 | 10 | 20 | 1000 | 10 | 20 | Example |
| 29 | 100 | 10 | 0.5 | 1000 | 10 | 20 | 1000 | 10 | 20 | Example |
| 30 | 100 | 10 | 0.5 | 1000 | 10 | 20 | 1000 | 10 | 20 | Example |
| 31 | 100 | 10 | 0.5 | 1000 | 10 | 20 | 1000 | 10 | 20 | Example |

TABLE 4

| | Solidification microstructure | | | Base | Total area ratio of ferrite and bainite (%) | | | Average grain size of ferrite and bainite (μm) | | | | Cladding metal | |
|---|---|---|---|---|---|---|---|---|---|---|---|---|---|
| No. | Position (i) | Position (ii) | Position (iii) | metal exposure | Position (i) | Position (ii) | Position (iii) | Position (i) | Position (ii) | Position (iii) | Toughness | corrosion resistance | Remarks |
| 1 | Not present | Not present | Not present | Not exposed | 95 | 95 | — | 8 | 8 | — | Excellent | Excellent | Example |
| 2 | Not present | Not present | Not present | Not exposed | 95 | 95 | — | 8 | 8 | — | Excellent | Excellent | Example |
| 3 | Not present | Not present | Not present | Not exposed | 95 | 95 | — | 8 | 8 | — | Excellent | Excellent | Example |
| 4 | Not present | Not present | Not present | Not exposed | 95 | 95 | — | 8 | 8 | — | Excellent | Excellent | Example |
| 5 | Not present | Not present | Not present | Not exposed | 95 | 95 | — | 8 | 8 | — | Excellent | Excellent | Example |
| 6 | Not present | Not present | Not present | Not exposed | 95 | 95 | — | 8 | 8 | — | Excellent | Excellent | Example |
| 7 | Not present | Not present | Present | Not exposed | 95 | 95 | — | 8 | 8 | — | Poor | Excellent | Comparative Example |
| 8 | Not present | Not present | Present | Exposed | 95 | 95 | — | 8 | 8 | — | Poor | Poor | Comparative Example |

TABLE 4-continued

| No. | Solidification microstructure Position (i) | Position (ii) | Position (iii) | Base metal exposure | Total area ratio of ferrite and bainite (%) Position (i) | Position (ii) | Position (iii) | Average grain size of ferrite and bainite (μm) Position (i) | Position (ii) | Position (iii) | Toughness | Cladding metal corrosion resistance | Remarks |
|---|---|---|---|---|---|---|---|---|---|---|---|---|---|
| 9 | Not present | Not present | Present | Not exposed | 95 | 95 | — | 8 | 8 | — | Poor | Excellent | Comparative Example |
| 10 | Not present | Not present | Not present | Exposed | 95 | 95 | — | 8 | 8 | — | Poor | Poor | Comparative Example |
| 11 | Not present | Not present | Not present | Exposed | 95 | 95 | — | 8 | 8 | — | Poor | Poor | Comparative Example |
| 12 | Not present | Not present | Present | Not exposed | 95 | 95 | — | 8 | 8 | — | Poor | Excellent | Comparative Example |
| 13 | Present | Present | Present | Not exposed | 95 | 95 | — | 8 | 8 | — | Poor | Excellent | Comparative Example |
| 14 | Not present | Not present | Present | Not exposed | 95 | 95 | — | 8 | 8 | — | Poor | Excellent | Comparative Example |
| 15 | Not present | Not present | Present | Not exposed | 95 | 95 | — | 8 | 8 | — | Poor | Excellent | Comparative Example |
| 16 | Not present | Not present | Present | Not exposed | 95 | 95 | — | 8 | 8 | — | Poor | Excellent | Comparative Example |
| 17 | Not present | Not present | Not present | Not exposed | 85 | 95 | — | 8 | 8 | — | Good | Excellent | Example |
| 18 | Not present | Not present | Not present | Not exposed | 95 | 95 | — | 8 | 8 | — | Excellent | Good | Example |
| 19 | Not present | Not present | Not present | Not exposed | 95 | 95 | — | 18 | 8 | — | Good | Excellent | Example |
| 20 | Not present | Not present | Not present | Not exposed | 95 | 95 | — | 8 | 10 | — | Excellent | Good | Example |
| 21 | Not present | Not present | Not present | Not exposed | 95 | 95 | — | 8 | 8 | — | Excellent | Good | Example |
| 22 | Not present | Not present | Not present | Not exposed | 85 | 95 | — | 8 | 8 | — | Good | Excellent | Example |
| 23 | Not present | Not present | Not present | Not exposed | 95 | 95 | — | 8 | 8 | — | Excellent | Good | Example |
| 24 | Not present | Not present | Not present | Not exposed | 80 | 95 | — | 10 | 8 | — | Good | Excellent | Example |
| 25 | Not present | Not present | Not present | Not exposed | 95 | 95 | — | 8 | 8 | — | Excellent | Excellent | Example |
| 26 | Not present | Not present | Not present | Not exposed | 95 | 95 | — | 8 | 8 | — | Excellent | Excellent | Example |
| 27 | Not present | Not present | Not present | Not exposed | 95 | 95 | — | 8 | 8 | — | Excellent | Excellent | Example |
| 28 | Not present | Not present | Not present | Not exposed | 95 | 95 | — | 8 | 8 | — | Excellent | Excellent | Example |
| 29 | Not present | Not present | Not present | Not exposed | 95 | 95 | — | 8 | 8 | — | Excellent | Excellent | Example |
| 30 | Not present | Not present | Not present | Not exposed | 95 | 95 | — | 8 | 8 | — | Excellent | Excellent | Example |
| 31 | Not present | Not present | Not present | Not exposed | — | 95 | 95 | — | 8 | 8 | Excellent | Excellent | Example |

As can be understood from the results in Table 4, each electric resistance welded clad steel pipe or tube satisfying the conditions according to the present disclosure was superior in the toughness of the weld, and also had superior performance in the corrosion resistance required of clad steel pipes or tubes. Moreover, by performing post-welding heat treatment under specific conditions so that the metallic microstructure in the base metal portion had a total area ratio of ferrite and bainite of 90% or more and an average grain size of ferrite and bainite of 15 μm or less, the toughness in the weld was further improved.

Example 2

Electric-resistance-welded three-layer clad steel pipes or tubes were produced by the following procedure. First, each three-layer clad hot-rolled steel strip obtained by bonding a second layer and a third layer made of cladding metal having the chemical composition shown in Table 5 to the respective surfaces of a first layer made of base metal having the chemical composition shown in Table 6 was produced. The respective thicknesses of the first to third layers are shown in Table 7.

Next, a clad steel pipe or tube of 400 mm in outer diameter was produced under various conditions by the electric-resistance-welded steel pipe or tube production line illustrated in FIG. 2, using the prepared clad steel strip as raw material so that the second layer forms the inner surface. Here, both transverse ends of the clad steel strip were subjected to groove machining by the rolling-type groove machine 40, to form an X-groove of the shape shown in Table 7 at the transverse ends.

The amount of upset in the electric resistance welding is shown in Table 7. During the electric resistance welding, the parts to be welded were shielded with shielding gas using the nozzle illustrated in FIGS. 13A to 13C under the conditions of nozzle height H, gas release flow rate B, and flow rate ratio B/A shown in Table 7. The shielding gas was nitrogen.

After this, post-welding heat treatment was performed under the conditions shown in Table 8.

For each obtained electric-resistance-welded clad steel pipe or tube, whether or not solidification microstructure was present, whether or not the base metal was exposed, the total area ratio of ferrite and bainite, and the average grain size of ferrite and bainite were evaluated by the following methods. The obtained results are shown in Table 9. In the measurements described below, the measurement results of whether or not solidification microstructure was present, the area ratio, and the average grain size were the same on the right and left sides of the weld metal in a section perpendicular to the pipe or tube longitudinal direction.

(Solidification Microstructure)

Whether or not solidification microstructure was present at each of the positions (i) to (iii) was determined based on an image of a predetermined region taken using an optical microscope at 400 magnifications.

(Exposure of Base Metal)

A section perpendicular to the pipe or tube longitudinal direction of the obtained electric-resistance-welded clad steel pipe or tube was etched with a nital solution. In the case where both the inner surface and the outer surface of the clad steel pipe or tube were continuously covered by a region not etched at all (i.e. the cladding metal), it was determined that the base metal was not exposed. Otherwise, i.e. in the case where an etched region was observed at at least one of the inner surface and the outer surface, it was determined that the base metal was exposed.

(Area Ratio)

A test piece was collected from each electric resistance welded clad steel pipe or tube so that the position (ii) was an observation position. The test piece was polished, and etched with a nital solution to reveal microstructure. An image of metallic microstructure at 400 magnifications was obtained using an optical microscope. The image was analyzed using an image analyzer, and the total area ratio of ferrite and bainite was calculated.

(Average Grain Size)

A test piece was collected from each obtained electric resistance welded clad steel pipe or tube so that the position (ii) was an observation position. The crystal grain boundaries at the test piece surface were revealed by etching with a nital solution, and an image of metallic microstructure was obtained using an optical microscope. The grain size was measured from the image by the cutting method described in ASTM E112, and the nominal grain size was taken to be the average grain size.

Furthermore, the following tests were performed to evaluate the toughness in the weld and the corrosion resistance of the cladding metal of the obtained electric resistance welded clad steel pipe or tube. The obtained results are shown in Table 9.

(Toughness)

A V-notch test piece was collected so that the longitudinal direction of the test piece was the circumferential direction of the steel pipe or tube, the notch position was the weld, and the notch direction was the longitudinal direction of the steel pipe or tube, and a Charpy impact test in accordance with ASTM A370 was performed to determine the fracture appearance transition temperature vTrs (° C.). The toughness of the weld was evaluated using the obtained value of vTrs, based on the following criteria.

Excellent: vTrs: −45° C. or less
Good: vTrs: more than −45° C. and −30° C. or less
Poor: vTrs: more than −30° C.

(Corrosion Resistance of Cladding Metal)

In addition, the corrosion resistance of the cladding metal was evaluated by a sulfuric acid-copper sulfate corrosion test in accordance with ASTM A262-13, Practice E, with reference to API specification 5LD, 4$^{th}$ Edition. To evaluate the corrosion resistance of the cladding metal, the base metal side was removed by grinding while leaving the cladding metal side, to obtain a test piece made only of the cladding metal. In the evaluation of the corrosion resistance, the test piece after the test was observed visually or observed at 10 magnifications using a stereoscopic microscope or the like as appropriate, and each test piece observed to have no crack was determined as "good" and each test piece observed to have any crack was determined as "poor". Further, the corrosion resistance of each test piece determined as "good" was also evaluated by a ferric chloride test described in ASTM G48-A. Each test piece whose corrosion loss in a 72 hr corrosion test was less than 0.5 g/m$^2$ was determined as "excellent".

TABLE 5

| Cladding metal ID | Chemical composition (mass %) * | | | | | | | | | | | | | Category |
|---|---|---|---|---|---|---|---|---|---|---|---|---|---|---|
| | C | Si | Mn | P | S | Ni | Cr | Al | N | Mo | Cu | Ti | Nb | |
| C1 | 0.04 | 0.20 | 0.60 | 0.025 | 0.001 | 0.20 | 16.1 | 0.01 | 0.04 | — | — | — | — | Stainless steel |
| C2 | 0.06 | 0.33 | 0.99 | 0.040 | 0.007 | 8.21 | 18.5 | 0.01 | 0.05 | — | — | — | — | Stainless steel |
| C3 | 0.02 | 0.13 | 0.03 | 0.004 | 0.001 | 61.60 | 21.3 | 0.12 | 0.05 | 8.6 | — | 0.25 | 3.31 | Nickel-containing alloy |
| C4 | 0.01 | 0.20 | 0.40 | 0.017 | 0.002 | 38.90 | 22.5 | 0.1 | 0.05 | 3.1 | 2.2 | 0.7 | — | Nickel-containing alloy |
| C5 | 0.02 | 0.76 | 1.06 | 0.032 | 0.002 | 12.18 | 17.44 | 0.01 | 0.03 | 2.3 | 0.24 | — | — | Stainless steel |
| C6 | 0.01 | 0.16 | 0.11 | 0.024 | 0.004 | 0.21 | 29.71 | 0.15 | 0.01 | 2.0 | 0.02 | — | 0.15 | Stainless steel |

* the balance being Fe and inevitable impurities

TABLE 6

| Base metal ID | Chemical composition (mass %) * | | | | | | | | | | | | Category |
|---|---|---|---|---|---|---|---|---|---|---|---|---|---|
| | C | Si | Mn | P | S | Al | Ca | Cr | Mo | Cu | Ti | Nb | |
| B1 | 0.04 | 0.19 | 1.6 | 0.006 | 0.003 | 0.04 | 0.0012 | — | — | — | 0.01 | 0.05 | Low-carbon steel |
| B2 | 0.05 | 0.25 | 1.5 | 0.013 | 0.003 | 0.03 | — | 0.3 | 0.4 | — | 0.01 | — | Low-alloy steel |

* the balance being Fe and inevitable impurities

TABLE 7

| | Cladding metal | | | Base metal | | | Groove machining conditions (inner surface side) | | | | |
| | | | | | | | | | | Cladding | |
| | Cladding | Second layer thickness | Third layer thickness | Base | First layer thickness | Whole thickness | Bevel angle | Groove depth | | metal thickness $t_{c1}$* at root | Projection clad ratio |
| No. | metal ID | $t_{c1}$ (mm) | $t_{c2}$ (mm) | metal ID | $t_m$ (mm) | t (mm) | θ1 (°) | d1 (mm) | d1/t (%) | surface (mm) | R1 (%) |
|---|---|---|---|---|---|---|---|---|---|---|---|
| 1 | C1 | 4.0 | 4.0 | B1 | 16.0 | 24 | 20 | 5.0 | 21 | 4 | 38 |
| 2 | C1 | 4.0 | 4.0 | B1 | 16.0 | 24 | 40 | 5.0 | 25 | 4 | 36 |
| 3 | C1 | 4.0 | 4.0 | B1 | 16.0 | 24 | 30 | 3.0 | 15 | 4 | 30 |
| 4 | C1 | 4.0 | 4.0 | B1 | 16.0 | 24 | 20 | 5.0 | 25 | 4 | 38 |
| 5 | C1 | 4.0 | 4.0 | B1 | 16.0 | 24 | 20 | 5.0 | 25 | 4 | 38 |
| 6 | C1 | 4.0 | 4.0 | B1 | 16.0 | 24 | 20 | 5.0 | 25 | 4 | 38 |
| 7 | C1 | 4.0 | 4.0 | B1 | 16.0 | 24 | 20 | 5.0 | 25 | 4 | 38 |
| 8 | C1 | 4.0 | 4.0 | B1 | 16.0 | 24 | <u>8</u> | 5.0 | 25 | 4 | 39 |
| 9 | C1 | 4.0 | 4.0 | B1 | 16.0 | 24 | <u>60</u> | 5.0 | 25 | 4 | 35 |
| 10 | C1 | 4.0 | 4.0 | B1 | 16.0 | 24 | 20 | 10 | <u>50</u> | 4 | 56 |
| 11 | C1 | 4.0 | 4.0 | B1 | 16.0 | 24 | 20 | 1.0 | <u>5</u> | 3 | 18 |
| 12 | C1 | 4.0 | 4.0 | B1 | 16.0 | 24 | 20 | 5.0 | 25 | 4 | 38 |
| 13 | C1 | 4.0 | 4.0 | B1 | 16.0 | 24 | 20 | 5.0 | 25 | 4 | 38 |
| 14 | C1 | 4.0 | 4.0 | B1 | 16.0 | 24 | 20 | 5.0 | 25 | 4 | 38 |
| 15 | C1 | 4.0 | 4.0 | B1 | 16.0 | 24 | 20 | 5.0 | 25 | 4 | 38 |
| 16 | C1 | 4.0 | 4.0 | B1 | 16.0 | 24 | 20 | 5.0 | 25 | 4 | 38 |
| 17 | C1 | 4.0 | 4.0 | B1 | 16.0 | 24 | 20 | 5.0 | 25 | 4 | 38 |
| 18 | C1 | 4.0 | 4.0 | B1 | 16.0 | 24 | 20 | 5.0 | 25 | 4 | 38 |
| 19 | C1 | 4.0 | 4.0 | B1 | 16.0 | 24 | 20 | 5.0 | 21 | 4 | 38 |
| 20 | C1 | 4.0 | 4.0 | B1 | 16.0 | 24 | 20 | 5.0 | 21 | 4 | 38 |
| 21 | C1 | 4.0 | 4.0 | B1 | 16.0 | 24 | 20 | 5.0 | 21 | 4 | 38 |
| 22 | C1 | 4.0 | 4.0 | B1 | 16.0 | 24 | 20 | 5.0 | 21 | 4 | 38 |
| 23 | C1 | 4.0 | 4.0 | B1 | 16.0 | 24 | 20 | 5.0 | 21 | 4 | 38 |
| 24 | C1 | 4.0 | 4.0 | B1 | 16.0 | 24 | 20 | 5.0 | 21 | 4 | 38 |
| 25 | C1 | 4.0 | 4.0 | B1 | 16.0 | 24 | 20 | 5.0 | 21 | 4 | 38 |
| 26 | C1 | 4.0 | 4.0 | B1 | 16.0 | 24 | 20 | 5.0 | 21 | 4 | 38 |
| 27 | C1 | 4.0 | 4.0 | B1 | 16.0 | 24 | 20 | 5.0 | 21 | 4 | 38 |
| 28 | C1 | 4.0 | 4.0 | B1 | 16.0 | 24 | 20 | 5.0 | 21 | 4 | 38 |
| 29 | C1 | 4.0 | 4.0 | B1 | 16.0 | 24 | 20 | 5.0 | 21 | 4 | 38 |
| 30 | C1 | 4.0 | 4.0 | B1 | 16.0 | 24 | 20 | 5.0 | 21 | 4 | 38 |
| 31 | C2 | 4.0 | 4.0 | B1 | 16.0 | 24 | 20 | 5.0 | 21 | 4 | 38 |
| 32 | C1 | 4.0 | 4.0 | B2 | 16.0 | 24 | 20 | 5.0 | 21 | 4 | 38 |
| 33 | C3 | 4.0 | 4.0 | B1 | 16.0 | 24 | 20 | 5.0 | 21 | 4 | 38 |
| 34 | C4 | 4.0 | 4.0 | B1 | 16.0 | 24 | 20 | 5.0 | 21 | 4 | 38 |
| 35 | C5 | 4.0 | 4.0 | B1 | 16.0 | 24 | 20 | 5.0 | 21 | 4 | 38 |
| 36 | C6 | 4.0 | 4.0 | B1 | 16.0 | 24 | 20 | 5.0 | 21 | 4 | 38 |
| 37 | C1 | 4.0 | 4.0 | B1 | 16.0 | 24 | 20 | 5.0 | 21 | 4 | 38 |

| | Groove machining conditions (outer surface side) | | | | | Gas shielding conditions | | | |
| | Bevel angle | Groove depth | | Cladding metal thickness $t_{c2}$* at root | Projection clad ratio | Amount of upset | Nozzle height | Gas release flow rate | Gas flow rate ratio | |
| No. | θ2 (°) | d2 (mm) | d2/t (%) | surface (mm) | R2 (%) | (mm) | H (mm) | B (m/s) | B/A | Remarks |
|---|---|---|---|---|---|---|---|---|---|---|
| 1 | 20 | 5.0 | 21 | 4.1 | 38 | 10 | 100 | 10 | 0.5 | Example |
| 2 | 40 | 5.0 | 25 | 3.7 | 36 | 10 | 100 | 10 | 0.5 | Example |
| 3 | 30 | 3.0 | 15 | 4.2 | 30 | 10 | 100 | 10 | 0.5 | Example |
| 4 | 20 | 5.0 | 25 | 4.1 | 38 | 18 | 100 | 10 | 0.05 | Example |
| 5 | 20 | 5.0 | 25 | 4.1 | 38 | 10 | 8 | 10 | 0.5 | Example |
| 6 | 20 | 5.0 | 25 | 4.1 | 38 | 10 | 280 | 10 | 5 | Example |
| 7 | 20 | 5.0 | 25 | 4.1 | 38 | 10 | 100 | 45 | 0.5 | Example |
| 8 | <u>8</u> | 5.0 | 25 | 4.3 | 39 | 10 | 100 | 10 | 0.5 | Comparative Example |
| 9 | <u>60</u> | 5.0 | 25 | 3.5 | 35 | 10 | 100 | 10 | 0.5 | Comparative Example |
| 10 | 20 | 10 | <u>50</u> | 3.5 | 56 | 10 | 100 | 10 | 0.5 | Comparative Example |
| 11 | 20 | 1.0 | <u>5</u> | 3.2 | 18 | 10 | 100 | 10 | 0.5 | Comparative Example |
| 12 | 20 | 5.0 | 25 | 4.1 | 38 | <u>25</u> | 100 | 10 | 0.5 | Comparative Example |
| 13 | 20 | 5.0 | 25 | 4.1 | 38 | 10 | <u>3</u> | 10 | 0.5 | Comparative Example |

TABLE 7-continued

| | | | | | | | | | | |
|---|---|---|---|---|---|---|---|---|---|---|
| 14 | 20 | 5.0 | 25 | 4.1 | 38 | 10 | <u>350</u> | 10 | 0.5 | Comparative Example |
| 15 | 20 | 5.0 | 25 | 4.1 | 38 | 10 | 100 | <u>0.2</u> | 0.5 | Comparative Example |
| 16 | 20 | 5.0 | 25 | 4.1 | 38 | 10 | 100 | <u>60</u> | 0.5 | Comparative Example |
| 17 | 20 | 5.0 | 25 | 4.1 | 38 | 10 | 100 | 10 | <u>0.005</u> | Comparative Example |
| 18 | 20 | 5.0 | 25 | 4.1 | 38 | 10 | 100 | 10 | <u>12</u> | Comparative Example |
| 19 | 20 | 5.0 | 21 | 4.1 | 38 | 10 | 100 | 10 | 0.5 | Example |
| 20 | 20 | 5.0 | 21 | 4.1 | 38 | 10 | 100 | 10 | 0.5 | Example |
| 21 | 20 | 5.0 | 21 | 4.1 | 38 | 10 | 100 | 10 | 0.5 | Example |
| 22 | 20 | 5.0 | 21 | 4.1 | 38 | 10 | 100 | 10 | 0.5 | Example |
| 23 | 20 | 5.0 | 21 | 4.1 | 38 | 10 | 100 | 10 | 0.5 | Example |
| 24 | 20 | 5.0 | 21 | 4.1 | 38 | 10 | 100 | 10 | 0.5 | Example |
| 25 | 20 | 5.0 | 21 | 4.1 | 38 | 10 | 100 | 10 | 0.5 | Example |
| 26 | 20 | 5.0 | 21 | 4.1 | 38 | 10 | 100 | 10 | 0.5 | Example |
| 27 | 20 | 5.0 | 21 | 4.1 | 38 | 10 | 100 | 10 | 0.5 | Example |
| 28 | 20 | 5.0 | 21 | 4.1 | 38 | 10 | 100 | 10 | 0.5 | Example |
| 29 | 20 | 5.0 | 21 | 4.1 | 38 | 10 | 100 | 10 | 0.5 | Example |
| 30 | 20 | 5.0 | 21 | 4.1 | 38 | 10 | 100 | 10 | 0.5 | Example |
| 31 | 20 | 5.0 | 21 | 4.1 | 38 | 10 | 100 | 10 | 0.5 | Example |
| 32 | 20 | 5.0 | 21 | 4.1 | 38 | 10 | 100 | 10 | 0.5 | Example |
| 33 | 20 | 5.0 | 21 | 4.1 | 38 | 10 | 100 | 10 | 0.5 | Example |
| 34 | 20 | 5.0 | 21 | 4.1 | 38 | 10 | 100 | 10 | 0.5 | Example |
| 35 | 20 | 5.0 | 21 | 4.1 | 38 | 10 | 100 | 10 | 0.5 | Example |
| 36 | 20 | 5.0 | 21 | 4.1 | 38 | 10 | 100 | 10 | 0.5 | Example |
| 37 | 20 | 5.0 | 21 | 4.1 | 38 | 10 | 100 | 10 | 0.5 | Example |

TABLE 8

Post-welding heat treatment conditions

| | Outer surface (cladding metal) | | | Inner surface (cladding metal) | | | Wall thickness center (base metal) | | | |
|---|---|---|---|---|---|---|---|---|---|---|
| No. | Heating temperature (° C.) | Holding time (s) | Cooling rate (° C./sec) | Heating temperature (° C.) | Holding time (s) | Cooling rate (° C./sec) | Heating temperature (° C.) | Holding time (s) | Cooling rate (° C./sec) | Remarks |
| 1 | 1000 | 10 | 20 | 1000 | 10 | 20 | 1000 | 10 | 20 | Example |
| 2 | 1000 | 10 | 20 | 1000 | 10 | 20 | 1000 | 10 | 20 | Example |
| 3 | 1000 | 10 | 20 | 1000 | 10 | 20 | 1000 | 10 | 20 | Example |
| 4 | 1000 | 10 | 20 | 1000 | 10 | 20 | 1000 | 10 | 20 | Example |
| 5 | 1000 | 10 | 20 | 1000 | 10 | 20 | 1000 | 10 | 20 | Example |
| 6 | 1000 | 10 | 20 | 1000 | 10 | 20 | 1000 | 10 | 20 | Example |
| 7 | 1000 | 10 | 20 | 1000 | 10 | 20 | 1000 | 10 | 20 | Example |
| 8 | 1000 | 10 | 20 | 1000 | 10 | 20 | 1000 | 10 | 20 | Comparative Example |
| 9 | 1000 | 10 | 20 | 1000 | 10 | 20 | 1000 | 10 | 20 | Comparative Example |
| 10 | 1000 | 10 | 20 | 1000 | 10 | 20 | 1000 | 10 | 20 | Comparative Example |
| 11 | 1000 | 10 | 20 | 1000 | 10 | 20 | 1000 | 10 | 20 | Comparative Example |
| 12 | 1000 | 10 | 20 | 1000 | 10 | 20 | 1000 | 10 | 20 | Comparative Example |
| 13 | 1000 | 10 | 20 | 1000 | 10 | 20 | 1000 | 10 | 20 | Comparative Example |
| 14 | 1000 | 10 | 20 | 1000 | 10 | 20 | 1000 | 10 | 20 | Comparative Example |
| 15 | 1000 | 10 | 20 | 1000 | 10 | 20 | 1000 | 10 | 20 | Comparative Example |
| 16 | 1000 | 10 | 20 | 1000 | 10 | 20 | 1000 | 10 | 20 | Comparative Example |
| 17 | 1000 | 10 | 20 | 1000 | 10 | 20 | 1000 | 10 | 20 | Comparative Example |
| 18 | 1000 | 10 | 20 | 1000 | 10 | 20 | 1000 | 10 | 20 | Comparative Example |
| 19 | 1000 | 10 | 20 | 900 | 10 | 20 | 700 | 10 | 20 | Example |
| 20 | 700 | 10 | 20 | 900 | 10 | 20 | 900 | 10 | 20 | Example |
| 21 | 900 | 10 | 20 | 700 | 10 | 20 | 900 | 10 | 20 | Example |
| 22 | 1000 | 10 | 20 | 1000 | 10 | 10 | 1000 | 10 | 5 | Example |
| 23 | 1000 | 10 | 2 | 1000 | 10 | 10 | 1000 | 10 | 10 | Example |
| 24 | 1000 | 10 | 20 | 1000 | 10 | 2 | 1000 | 10 | 10 | Example |
| 25 | 1000 | 10 | 90 | 1000 | 10 | 90 | 1000 | 10 | 80 | Example |
| 26 | 1000 | 10 | 120 | 1000 | 10 | 90 | 1000 | 10 | 50 | Example |
| 27 | 1000 | 10 | 90 | 1000 | 10 | 120 | 1000 | 10 | 50 | Example |
| 28 | 1230 | 10 | 20 | 1230 | 10 | 20 | 1230 | 10 | 20 | Example |
| 29 | 1300 | 10 | 20 | 1150 | 10 | 20 | 1150 | 10 | 20 | Example |
| 30 | 1150 | 10 | 20 | 1300 | 10 | 20 | 1150 | 10 | 20 | Example |
| 31 | 1000 | 10 | 20 | 1000 | 10 | 20 | 1000 | 10 | 20 | Example |
| 32 | 1000 | 10 | 20 | 1000 | 10 | 20 | 1000 | 10 | 20 | Example |
| 33 | 1000 | 10 | 20 | 1000 | 10 | 20 | 1000 | 10 | 20 | Example |
| 34 | 1000 | 10 | 20 | 1000 | 10 | 20 | 1000 | 10 | 20 | Example |

TABLE 8-continued

Post-welding heat treatment conditions

| | Outer surface (cladding metal) | | | Inner surface (cladding metal) | | | Wall thickness center (base metal) | | | |
|---|---|---|---|---|---|---|---|---|---|---|
| No. | Heating temperature (° C.) | Holding time (s) | Cooling rate (° C./sec) | Heating temperature (° C.) | Holding time (s) | Cooling rate (° C./sec) | Heating temperature (° C.) | Holding time (s) | Cooling rate (° C./sec) | Remarks |
| 35 | 1000 | 10 | 20 | 1000 | 10 | 20 | 1000 | 10 | 20 | Example |
| 36 | 1000 | 10 | 20 | 1000 | 10 | 20 | 1000 | 10 | 20 | Example |
| 37 | 1000 | 10 | 20 | 1000 | 10 | 20 | 900 | 5 | 20 | Example |

TABLE 9

| | Solidification microstructure | | | | Total area ratio of ferrite and bainite (%) | Average grain size of ferrite and bainite (μm) | | Inner surface | Outer surface | |
|---|---|---|---|---|---|---|---|---|---|---|
| No. | Position (i) | Position (ii) | Position (iii) | Base metal exposure | Position (ii) | Position (ii) | Toughness | corrosion resistance | corrosion resistance | Remarks |
| 1 | Not present | Not present | Not present | Not present | 95 | 8 | Excellent | Excellent | Excellent | Example |
| 2 | Not present | Not present | Not present | Not present | 95 | 8 | Excellent | Excellent | Excellent | Example |
| 3 | Not present | Not present | Not present | Not present | 95 | 8 | Excellent | Excellent | Excellent | Example |
| 4 | Not present | Not present | Not present | Not present | 95 | 8 | Excellent | Excellent | Excellent | Example |
| 5 | Not present | Not present | Not present | Not present | 95 | 8 | Excellent | Excellent | Excellent | Example |
| 6 | Not present | Not present | Not present | Not present | 95 | 8 | Excellent | Excellent | Excellent | Example |
| 7 | Not present | Not present | Not present | Not present | 95 | 8 | Excellent | Excellent | Excellent | Example |
| 8 | Not present | Not present | Present | Not present | 95 | 8 | Poor | Excellent | Excellent | Comparative Example |
| 9 | Not present | Not present | Present | Present | 95 | 8 | Poor | Poor | Poor | Comparative Example |
| 10 | Present | Present | Present | Not present | 95 | 8 | Poor | Excellent | Excellent | Comparative Example |
| 11 | Present | Present | Present | Present | 95 | 8 | Poor | Poor | Poor | Comparative Example |
| 12 | Not present | Not present | Not present | Present | 95 | 8 | Poor | Poor | Poor | Comparative Example |
| 13 | Not present | Not present | Present | Not present | 95 | 8 | Poor | Excellent | Excellent | Comparative Example |
| 14 | Present | Present | Present | Not present | 95 | 8 | Poor | Excellent | Excellent | Comparative Example |
| 15 | Not present | Not present | Present | Not present | 95 | 8 | Poor | Excellent | Excellent | Comparative Example |
| 16 | Not present | Not present | Present | Not present | 95 | 8 | Poor | Excellent | Excellent | Comparative Example |
| 17 | Not present | Not present | Present | Not present | 95 | 8 | Poor | Excellent | Excellent | Comparative Example |
| 18 | Not present | Not present | Present | Not present | 95 | 8 | Poor | Excellent | Excellent | Comparative Example |
| 19 | Not present | Not present | Not present | Not present | 85 | 8 | Good | Excellent | Excellent | Example |
| 20 | Not present | Not present | Not present | Not present | 95 | 8 | Excellent | Excellent | Good | Example |
| 21 | Not present | Not present | Not present | Not present | 95 | 8 | Excellent | Good | Excellent | Example |
| 22 | Not present | Not present | Not present | Not present | 95 | 18 | Good | Excellent | Excellent | Example |
| 23 | Not present | Not present | Not present | Not present | 95 | 10 | Excellent | Excellent | Good | Example |
| 24 | Not present | Not present | Not present | Not present | 95 | 10 | Excellent | Good | Excellent | Example |
| 25 | Not present | Not present | Not present | Not present | 85 | 8 | Good | Excellent | Excellent | Example |
| 26 | Not present | Not present | Not present | Not present | 95 | 8 | Excellent | Excellent | Good | Example |
| 27 | Not present | Not present | Not present | Not present | 95 | 8 | Excellent | Good | Excellent | Example |
| 28 | Not present | Not present | Not present | Not present | 82 | 10 | Good | Excellent | Excellent | Example |
| 29 | Not present | Not present | Not present | Not present | 95 | 9 | Excellent | Excellent | Good | Example |
| 30 | Not present | Not present | Not present | Not present | 95 | 9 | Excellent | Good | Excellent | Example |
| 31 | Not present | Not present | Not present | Not present | 95 | 8 | Excellent | Excellent | Excellent | Example |
| 32 | Not present | Not present | Not present | Not present | 95 | 8 | Excellent | Excellent | Excellent | Example |
| 33 | Not present | Not present | Not present | Not present | 95 | 8 | Excellent | Excellent | Excellent | Example |
| 34 | Not present | Not present | Not present | Not present | 95 | 8 | Excellent | Excellent | Excellent | Example |
| 35 | Not present | Not present | Not present | Not present | 95 | 8 | Excellent | Excellent | Excellent | Example |
| 36 | Not present | Not present | Not present | Not present | 95 | 8 | Excellent | Excellent | Excellent | Example |
| 37 | Not present | Not present | Not present | Not present | 88 | 10 | Good | Excellent | Excellent | Example |

As can be understood from the results in Table 9, each electric resistance welded clad steel pipe or tube satisfying the conditions according to the present disclosure was superior in the toughness of the weld, and also had superior performance in the corrosion resistance required of clad steel pipes or tubes. Moreover, by performing post-welding heat treatment under specific conditions so that the metallic microstructure in the base metal portion at the wall thickness center position had a total area ratio of ferrite and bainite of 90% or more and an average grain size of ferrite and bainite of 15 μm or less, the toughness in the weld was further improved.

INDUSTRIAL APPLICABILITY

With the method of producing a clad steel pipe or tube according to the present disclosure, it is possible to produce a clad steel pipe or tube in which a region where solidification microstructure is formed, i.e. a region in a weld particularly having significant influence on properties, is reduced without impairing its function as a clad pipe or tube

REFERENCE SIGNS LIST

10 clad steel strip
11 first layer (base metal)

12 second layer (cladding metal)
12A second layer (cladding metal)
12B third layer (cladding metal)
13 clad interface
13A clad interface between first layer and second layer
13B clad interface between first layer and third layer
14 welded seam part
14A center of width of weld metal in pipe or tube circumferential direction
15A to 15C weld metal
16 element pipe or tube (open pipe or tube)
17 part to be welded (butted part of element pipe or tube)
18 butted part heating starting point of element pipe or tube
19 welding point
20 electric resistance welded clad steel pipe or tube
30 uncoiler
40 groove machine
42 upper side roll
42A rolling portion
44 lower side roll
50 roll former
60 high-frequency heating device
70 squeeze roll
80 shielding-gas blowing device
81 shielding-gas blowing nozzle
82 gas pipe
83 gas flow adjusting device
84A first split nozzle (both ends)
84B second split nozzle (center)
85A first gas outlet (both ends)
85B second gas outlet (center)
86 shielding gas
87 air entrainment
90 bead cutter
96 cutter
X pipe or tube passage direction
Y element pipe or tube butting direction
θ1 bevel angle on second layer side
θ2 bevel angle on third layer side
d1 groove depth on second layer side
d2 groove depth on third layer side
t thickness of clad steel strip (steel pipe or tube)
$t_m$ thickness of first layer (base metal)
$t_{c1}$ thickness of second layer
$t_{c1}$* thickness of second layer at root surface
$t_{w1}$ thickness of second layer in welded seam part
$t_{c2}$ thickness of third layer
$t_{c2}$*thickness of third layer at root surface
$t_{w2}$ thickness of third layer in welded seam part
C circular section of 0.1 mm in radius in plane perpendicular to pipe or tube longitudinal direction
L circular arc of 0.3 mm in arc length

The invention claimed is:
1. An electric resistance welded clad steel pipe or tube, comprising:
 a first layer made of carbon steel or low-alloy steel as base metal; and
 a second layer placed on one surface of the first layer, and made of stainless steel or a nickel-containing alloy as cladding metal,
 wherein the base metal is not exposed at a cladding metal-side surface of the electric resistance welded clad steel pipe or tube in a weld, and
 no solidification microstructure is contained in each of circular sections of 0.1 mm in radius respectively centered at the following positions (i) to (iii) in a plane perpendicular to a pipe or tube longitudinal direction:
  (i) a position that is 1 mm in depth from an outer surface of the electric resistance welded clad steel pipe or tube in the weld and is 0.3 mm in a transverse direction of weld metal from a center of a width of the weld metal in a pipe or tube circumferential direction;
  (ii) a position that is a center of the electric resistance welded clad steel pipe or tube in a thickness direction in the weld and is 0.3 mm in the transverse direction of the weld metal from the center of the width of the weld metal in the pipe or tube circumferential direction; and
  (iii) a position that is 1 mm in depth from an inner surface of the electric resistance welded clad steel pipe or tube in the weld and is 0.3 mm in the transverse direction of the weld metal from the center of the width of the weld metal in the pipe or tube circumferential direction.
2. The electric resistance welded clad steel pipe or tube according to claim 1, composed of the first layer and the second layer.
3. The electric resistance welded clad steel pipe or tube according to claim 2, wherein one of the following (A) and (B) is satisfied:
 (A) the first layer is located on an outer side of the electric resistance welded clad steel pipe or tube, and metallic microstructure at the positions (i) and (ii) is metallic microstructure in which a total area ratio of ferrite and bainite is 90% or more and an average grain size of ferrite and bainite is 15 μm or less; and
 (B) the first layer is located on an inner side of the electric resistance welded clad steel pipe or tube, and metallic microstructure at the positions (ii) and (iii) is metallic microstructure in which a total area ratio of ferrite and bainite is 90% or more and an average grain size of ferrite and bainite is 15 μm or less.
4. The electric resistance welded clad steel pipe or tube according to claim 1, composed of the first layer, the second layer, and a third layer placed on an other surface of the first layer and made of stainless steel or a nickel-containing alloy as cladding metal.
5. The electric resistance welded clad steel pipe or tube according to claim 4, wherein metallic microstructure at the position (ii) is metallic microstructure in which a total area ratio of ferrite and bainite is 90% or more and an average grain size of ferrite and bainite is 15 μm or less.
6. The electric resistance welded clad steel pipe or tube according to claim 1, wherein the cladding metal is stainless steel having a chemical composition containing, in mass %,
 C: 0.15% or less,
 Si: 5.0% or less,
 Mn: 2.0% or less,
 P: 0.1% or less,
 S: 0.1% or less,
 Ni: 1.0% or less,
 Cr: 11.0% or more, and
 N: 0.5% or less,
 with the balance being Fe and inevitable impurities.
7. The electric resistance welded clad steel pipe or tube according to claim 1, wherein the cladding metal is stainless steel or a nickel-containing alloy having a chemical composition containing, in mass %,
 C: 0.15% or less,
 Si: 5.0% or less,
 Mn: 2.0% or less,
 P: 0.1% or less,
 S: 0.1% or less,
 Ni: 6.0% or more,

Cr: 15.0% or more, and
N: 0.5% or less,
with the balance being Fe and inevitable impurities.

8. The electric resistance welded clad steel pipe or tube according to claim 6, wherein the chemical composition of the cladding metal further contains, in mass %, at least one of the following (a), (b), and (c):
(a) one or more selected from the group consisting of
Mo: 20.0% or less,
Cu: 5.0% or less,
Al: 2.0% or less,
Co: 3.0% or less,
W: 5.0% or less, and
Ta: 5.0% or less,
(b) one or more selected from the group consisting of
Ti: 2.0% or less,
Nb: 5.0% or less,
V: 2.0% or less, and
Zr: 2.0% or less, and
(c) one or more selected from the group consisting of
B: 0.0050% or less,
Ca: 0.0050% or less,
Mg: 0.0030% or less, and
REM: 0.10% or less.

9. The electric resistance welded clad steel pipe or tube according to claim 7, wherein the chemical composition of the cladding metal further contains, in mass %, at least one of the following (a), (b), and (c):
(a) one or more selected from the group consisting of
Mo: 20.0% or less,
Cu: 5.0% or less,
Al: 2.0% or less,
Co: 3.0% or less,
W: 5.0% or less, and
Ta: 5.0% or less,
(b) one or more selected from the group consisting of
Ti: 2.0% or less,
Nb: 5.0% or less,
V: 2.0% or less, and
Zr: 2.0% or less, and
(c) one or more selected from the group consisting of
B: 0.0050% or less,
Ca: 0.0050% or less,
Mg: 0.0030% or less, and
REM: 0.10% or less.

10. The electric resistance welded clad steel pipe or tube according to claim 1, wherein the base metal is carbon steel or low-alloy steel having a chemical composition containing, in mass %,
C: 0.02% to 0.20%,
Si: 0.01% to 1.0%,
Mn: 0.1% to 2.0%,
P: 0.05% or less,
S: 0.01% or less, and
Al: 0.1% or less,
with the balance being Fe and inevitable impurities.

11. The electric resistance welded clad steel pipe or tube according to claim 10, wherein the chemical composition of the base metal further contains, in mass %, one or more selected from the group consisting of
Ti: 0.1% or less,
Nb: 0.2% or less,
Cu: 0.5% or less,
Ni: 0.5% or less,
Cr: 0.5% or less,
Mo: 0.5% or less,
V: 0.1% or less, and
Ca: 0.0005% to 0.0050%.

12. A method of producing an electric resistance welded clad steel pipe or tube, the method comprising:
preparing a clad steel strip including a first layer made of carbon steel or low-alloy steel as base metal and a second layer placed on one surface of the first layer and made of stainless steel or a nickel-containing alloy as cladding metal;
subjecting both transverse ends of the clad steel strip to groove machining, to form a groove;
forming the clad steel strip into a pipe or tube shape, to obtain an open pipe or tube that is a cylindrical strip before welding; and
electric resistance welding a pair of butted parts of the open pipe or tube facing each other, to obtain an electric resistance welded clad steel pipe or tube,
wherein in the groove machining, the transverse ends of the clad steel strip are indented from a second layer side,
the groove satisfies the following conditions:
a clad interface between the second layer and the first layer turns from the second layer side toward a thickness center of the clad steel strip;
a bevel angle $\theta 1$ on the second layer side is 10° or more and 50° or less;
a groove depth d1 is 10% or more and 45% or less of a thickness t of the clad steel strip; and
a projection clad ratio R1 defined by the following Expression (1) is 25% or more and 50% or less, $$R1=(t_{c1}*+d1)/t\times 100(\%) \qquad (1)$$

where R1 is the projection clad ratio, $t_{c1}*$ is a thickness of the second layer at a root surface in mm, d1 is the groove depth on the second layer side in mm, and t is the thickness of the clad steel strip in mm,
the electric resistance welding is performed by, while subjecting the pair of butted parts to gas shielding, butt pressing the pair of butted parts with an amount of upset of not greater than the thickness t of the clad steel strip, and
the gas shielding is performed by blowing a shielding gas using a shielding-gas blowing nozzle having three or more slit-shaped gas outlets arranged in parallel with and adjacent to each other in a butting direction of the open pipe or tube at a position of 5 mm to 300 mm above upper ends of the butted parts of the open pipe or tube, under conditions that B is 0.5 m/s to 50 m/s and $0.010 \leq B/A \leq 10$, where A is a gas release flow rate in m/s from a pair of first gas outlets located at both ends among the gas outlets, and B is a gas release flow rate in m/s from a second gas outlet other than the first gas outlets.

13. The method of producing an electric resistance welded clad steel pipe or tube according to claim 12, wherein the clad steel strip is composed of the first layer and the second layer, and
the groove is a Y-groove.

14. The method of producing an electric resistance welded clad steel pipe or tube according to claim 13, further comprising
after the electric resistance welding, heat treating and then cooling the electric resistance welded clad steel pipe or tube,
wherein the heat treating is performed under conditions that a heating temperature at a cladding metal-side surface of the electric resistance welded clad steel pipe or tube is 750° C. to 1250° C. and a holding time at 750° C. to 1250° C. is 10 sec or more, and a heating temperature at a base metal-side surface of the electric resistance welded clad steel pipe or tube is 750° C. to 1200° C. and a holding time at 750° C. to 1200° C. is 10 sec or more, and the cooling is performed under conditions that an average cooling rate from 750° C. to 400° C. at the cladding metal-side surface of the electric resistance welded clad steel pipe or tube is 4° C./sec to 100° C./sec, and an average cooling rate from 750° C. to 400° C. at the base metal-side surface of the electric resistance welded clad steel pipe or tube is 8° C./sec to 70° C./sec.

15. The method of producing an electric resistance welded clad steel pipe or tube according to claim 12, wherein the clad steel strip is composed of the first layer, the second layer, and a third layer placed on an other surface of the first layer and made of stainless steel or a nickel-containing alloy as cladding metal, in the groove machining, further the transverse ends of the clad steel strip are indented from a third layer side,
the groove is an X-groove,
the groove further satisfies the following conditions:
a clad interface between the third layer and the first layer turns from the third layer side toward the thickness center of the clad steel strip;
a bevel angle θ2 on the third layer side is 10° or more and 50° or less;
a groove depth d2 is 10% or more and 45% or less of the thickness t of the clad steel strip; and
a projection clad ratio R2 defined by the following Expression (2) is 25% or more and 50% or less, $$R2=(t_{c2}{*}+d2)/t\times 100(\%) \qquad (2)$$

where R2 is the projection clad ratio, $t_{c2}{*}$ is a thickness of the third layer at the root surface in mm, d2 is the groove depth on the third layer side in mm, and t is the thickness of the clad steel strip in mm.

16. The method of producing an electric resistance welded clad steel pipe or tube according to claim 15, further comprising after the electric resistance welding, heat treating and then cooling the electric resistance welded clad steel pipe or tube,
wherein the heat treating is performed under conditions that a heating temperature at inner and outer surfaces of the electric resistance welded clad steel pipe or tube is 750° C. to 1250° C. and a holding time at 750° C. to 1250° C. is 10 sec or more, and a heating temperature at a wall thickness center position of the electric resistance welded clad steel pipe or tube is 750° C. to 1200° C. and a holding time at 750° C. to 1200° C. is 10 sec or more, and the cooling is performed under conditions that an average cooling rate from 750° C. to 400° C. at the inner and outer surfaces of the electric resistance welded clad steel pipe or tube is 4° C./sec to 100° C./sec, and an average cooling rate from 750° C. to 400° C. at the wall thickness center position of the electric resistance welded clad steel pipe or tube is 8° C./sec to 70° C./sec.

17. The method of producing an electric resistance welded clad steel pipe or tube according to claim 12, wherein the cladding metal is stainless steel having a chemical composition containing, in mass %,
C: 0.15% or less,
Si: 5.0% or less,
Mn: 2.0% or less,
P: 0.1% or less,
S: 0.1% or less,
Ni: 1.0% or less,
Cr: 11.0% or more, and
N: 0.5% or less,
with the balance being Fe and inevitable impurities.

18. The method of producing an electric resistance welded clad steel pipe or tube according to claim 12, wherein the cladding metal is stainless steel or a nickel-containing alloy having a chemical composition containing, in mass %,
C: 0.15% or less,
Si: 5.0% or less,
Mn: 2.0% or less,
P: 0.1% or less,
S: 0.1% or less,
Ni: 6.0% or more,
Cr: 15.0% or more, and
N: 0.5% or less,
with the balance being Fe and inevitable impurities.

19. The method of producing an electric resistance welded clad steel pipe or tube according to claim 12, wherein the base metal is carbon steel or low-alloy steel having a chemical composition containing, in mass %,
C: 0.02% to 0.20%,
Si: 0.01% to 1.0%,
Mn: 0.1% to 2.0%,
P: 0.05% or less,
S: 0.01% or less, and
Al: 0.1% or less,
with the balance being Fe and inevitable impurities.

20. The method of producing an electric resistance welded clad steel pipe or tube according to claim 19, wherein the chemical composition of the base metal further contains, in mass %, one or more selected from the group consisting of
Ti: 0.1% or less,
Nb: 0.2% or less,
Cu: 0.5% or less,
Ni: 0.5% or less,
Cr: 0.5% or less,
Mo: 0.5% or less,
V: 0.1% or less, and
Ca: 0.0005% to 0.0050%.

* * * * *